(12) United States Patent
Van Der Ent et al.

(10) Patent No.: US 8,327,612 B2
(45) Date of Patent: Dec. 11, 2012

(54) MOWING DEVICE

(75) Inventors: Willem Arie Van Der Ent, Rhoon (NL); Maarten Koorn, Schiedam (NL); Jelle Fredo Oudemans, Den Haag (NL); Shane A. Bollinger, Decatur, IL (US)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 12/778,265

(22) Filed: May 12, 2010

(65) Prior Publication Data

US 2011/0011049 A1 Jan. 20, 2011

Related U.S. Application Data

(63) Continuation of application No. PCT/NL2008/000249, filed on Nov. 12, 2008.

(60) Provisional application No. 60/987,623, filed on Nov. 13, 2007.

(30) Foreign Application Priority Data

| Oct. 14, 2007 | (NL) | 1034690 |
| Oct. 14, 2007 | (NL) | 1034691 |
| Oct. 14, 2007 | (NL) | 1034692 |
| Oct. 14, 2007 | (NL) | 1034693 |
| Aug. 19, 2008 | (NL) | 1035847 |

(51) Int. Cl.
*A01D 75/18* (2006.01)
(52) U.S. Cl. ............................. 56/10.3; 56/6
(58) Field of Classification Search ............... 56/6, 10.3, 56/11.3, 12.6, 12.7, 13.6, 17.5, 255, 295; 464/32
See application file for complete search history.

(56) References Cited

U.S. PATENT DOCUMENTS

| 4,497,161 A | 2/1985 | Vissers et al. | |
| 4,999,981 A | 3/1991 | Neuerburg | |
| 5,715,662 A * | 2/1998 | Walters | 56/6 |
| 6,487,835 B2 * | 12/2002 | Kraus et al. | 56/6 |
| 6,502,377 B2 * | 1/2003 | Kraus | 56/6 |
| 6,675,563 B1 * | 1/2004 | Ehrhart et al. | 56/10.3 |
| 6,718,745 B1 * | 4/2004 | Adams | 56/6 |
| 7,942,748 B2 * | 5/2011 | Harkcom et al. | 464/32 |
| 7,988,380 B2 * | 8/2011 | Harkcom et al. | 403/365 |
| 2006/0021316 A1 | 2/2006 | Harkcom | |

FOREIGN PATENT DOCUMENTS

| CA | 2189786 | 5/1979 |
| EP | 126518 A2 | 11/1984 |
| EP | 366580 A1 | 5/1990 |
| EP | 774202 A1 | 5/1997 |

(Continued)

*Primary Examiner* — Alicia Torres
(74) *Attorney, Agent, or Firm* — Coraline J. Haitjema; David P. Owen; Hoyng Monegier LLP

(57) ABSTRACT

Device for mowing crops, comprising a series of mowing units arranged side by side at predetermined distances, each mowing unit comprising a knife holder with at least one knife carrying portion for carrying a mowing knife, and a drive mechanism for each knife holder. The drive mechanism for each knife holder comprises a first drive element comprising a hub portion for carrying the respective knife holder, and a second drive element drivingly engaged with the first drive element to rotatingly drive the knife holder about a vertical axis. In normal operation, the knife holder and the hub portion form a unitary rotatable assembly which, at a position between the knife carrying portion and the hub portion, is provided with a break connection which is effective in a radial direction.

31 Claims, 22 Drawing Sheets

FOREIGN PATENT DOCUMENTS

| EP | 878120 | A2 | 11/1998 |
| EP | 1958493 | A1 | 8/2008 |
| GB | 1486052 | | 9/1977 |
| NL | 7407450 | | 12/1975 |

* cited by examiner

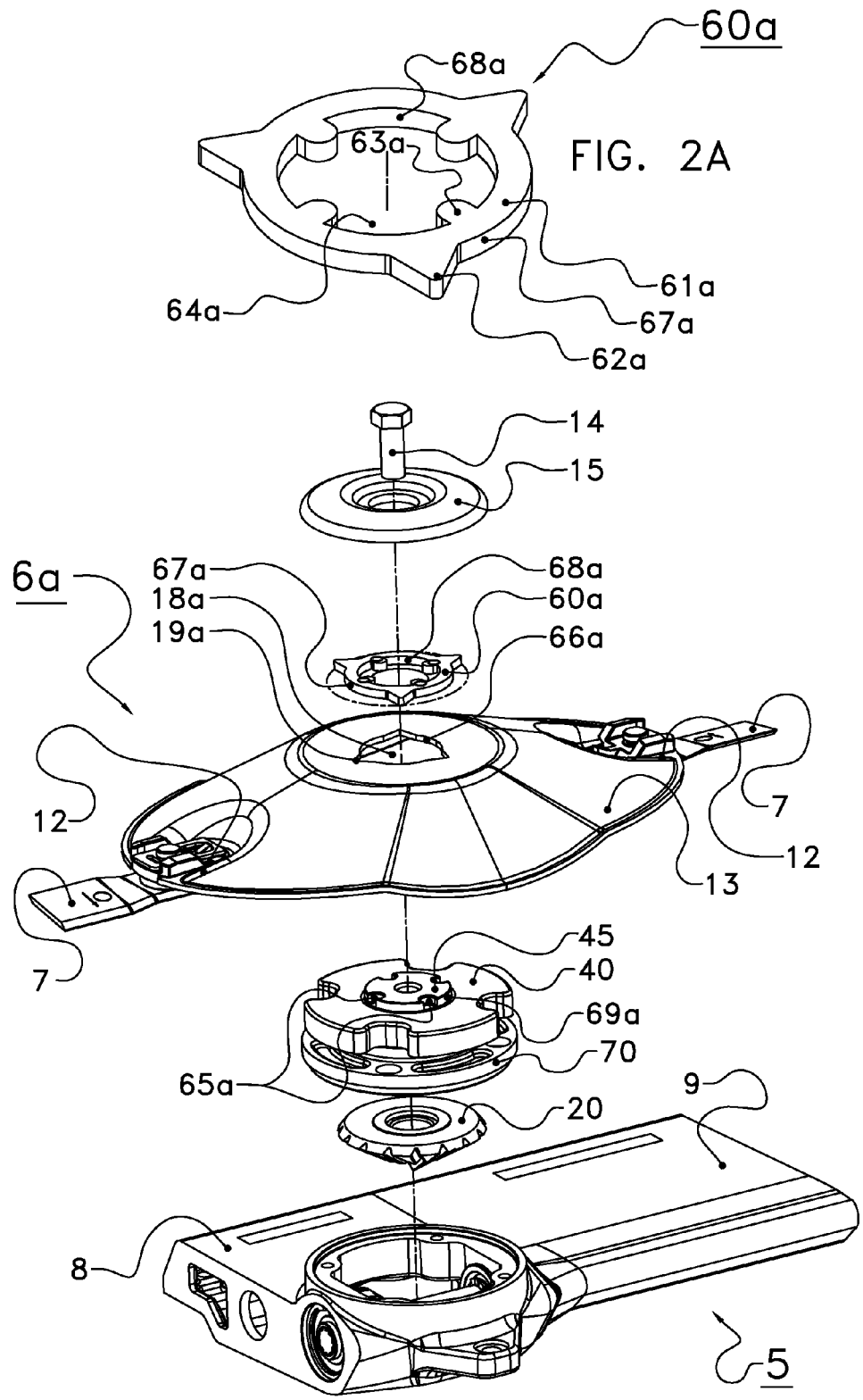

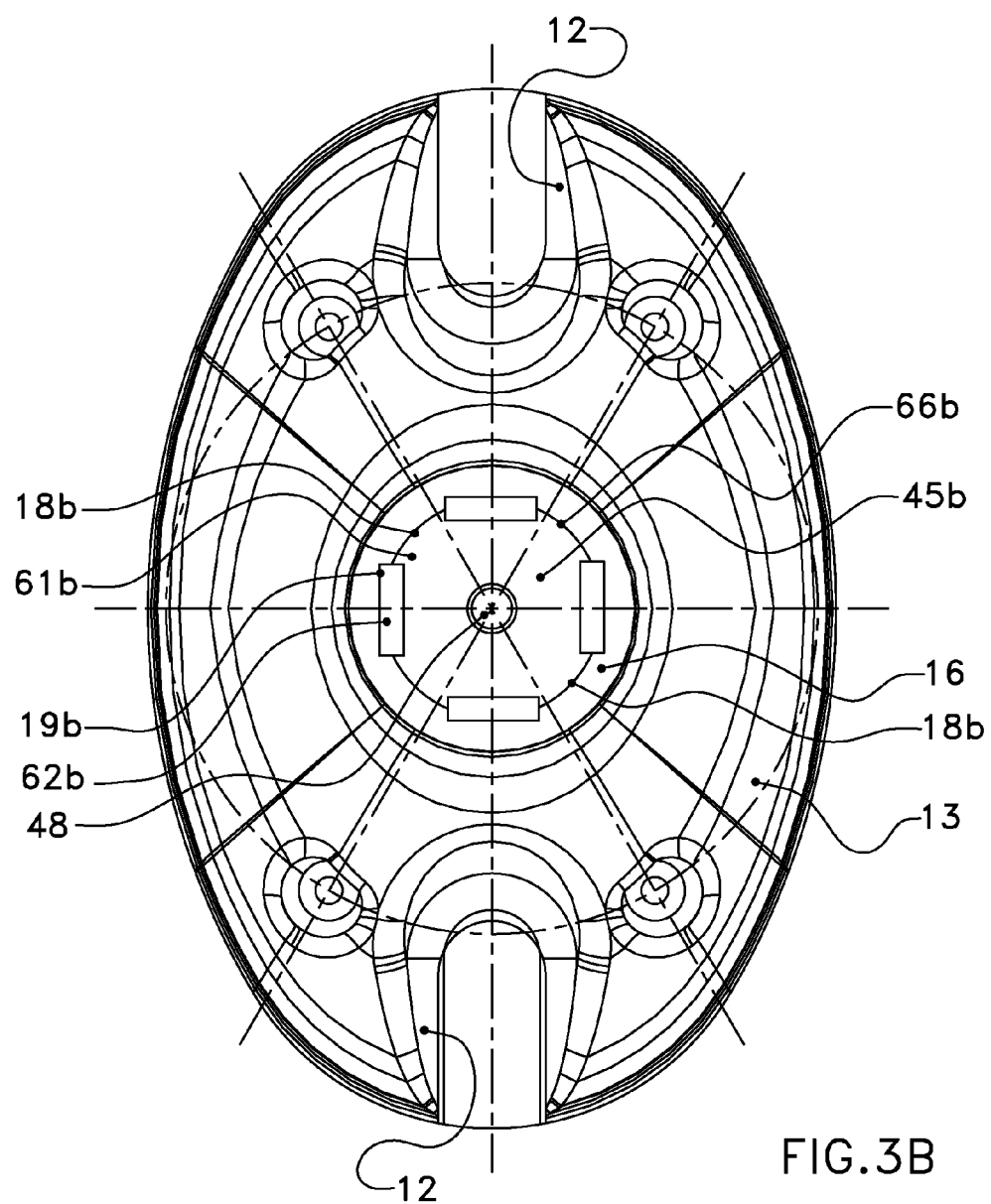
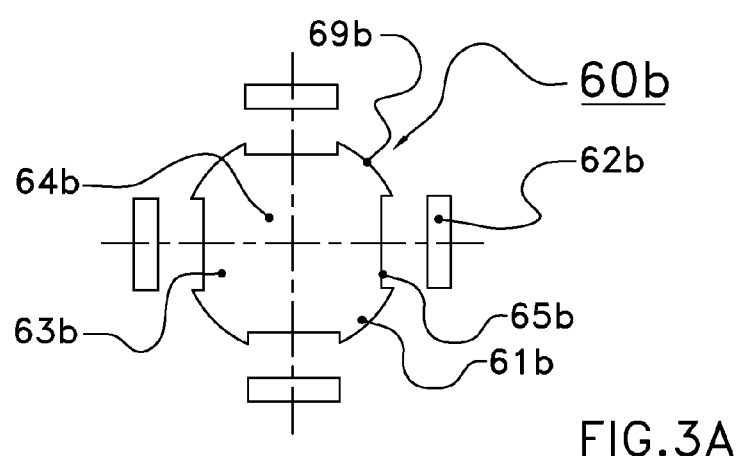
FIG.3B
FIG.3A

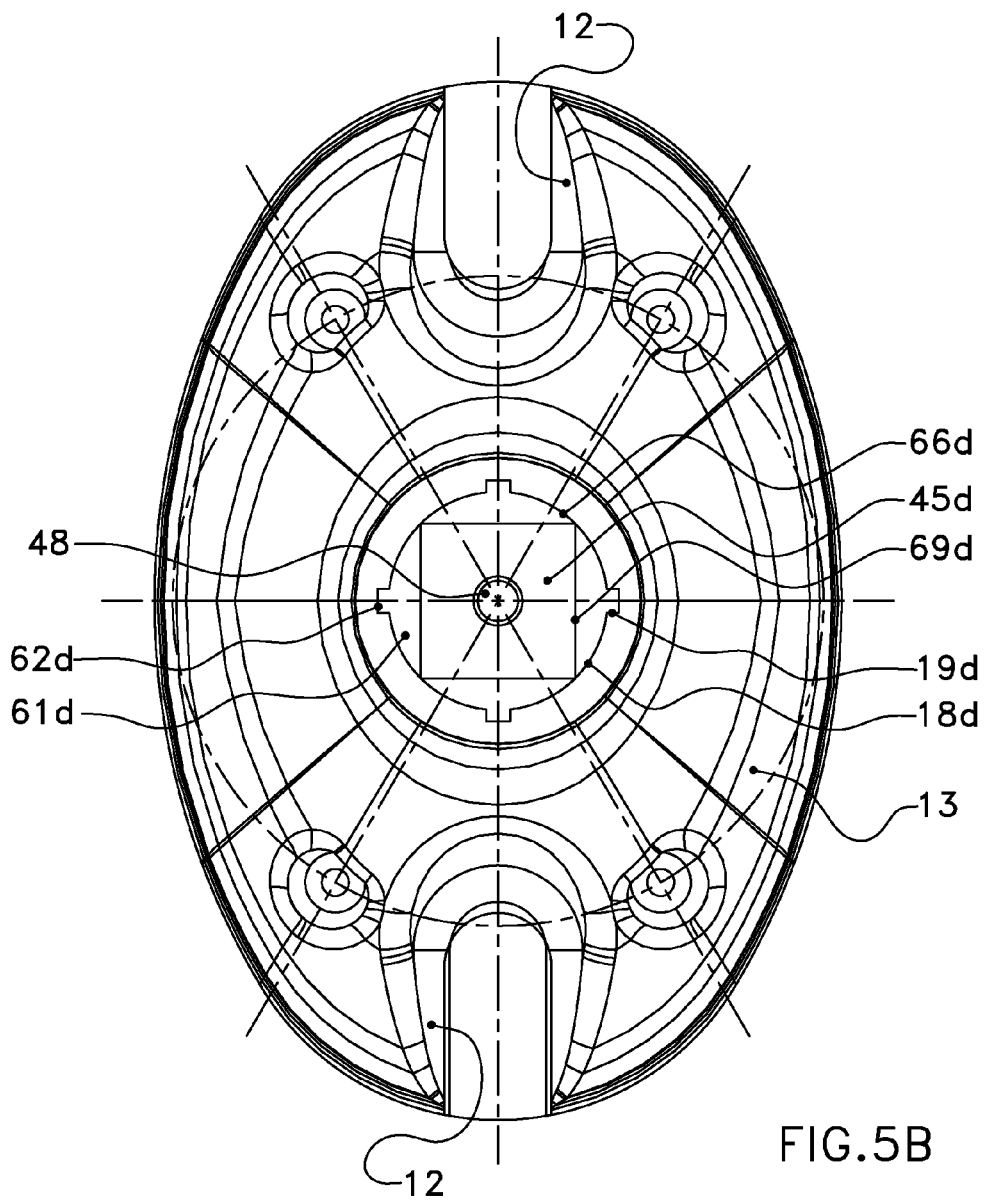
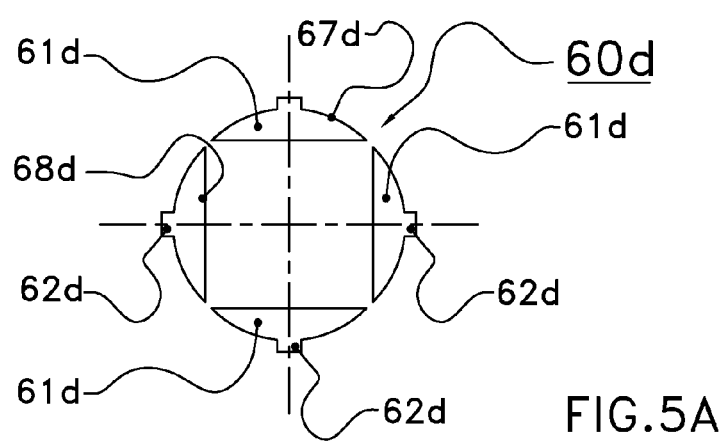
FIG.5B
FIG.5A

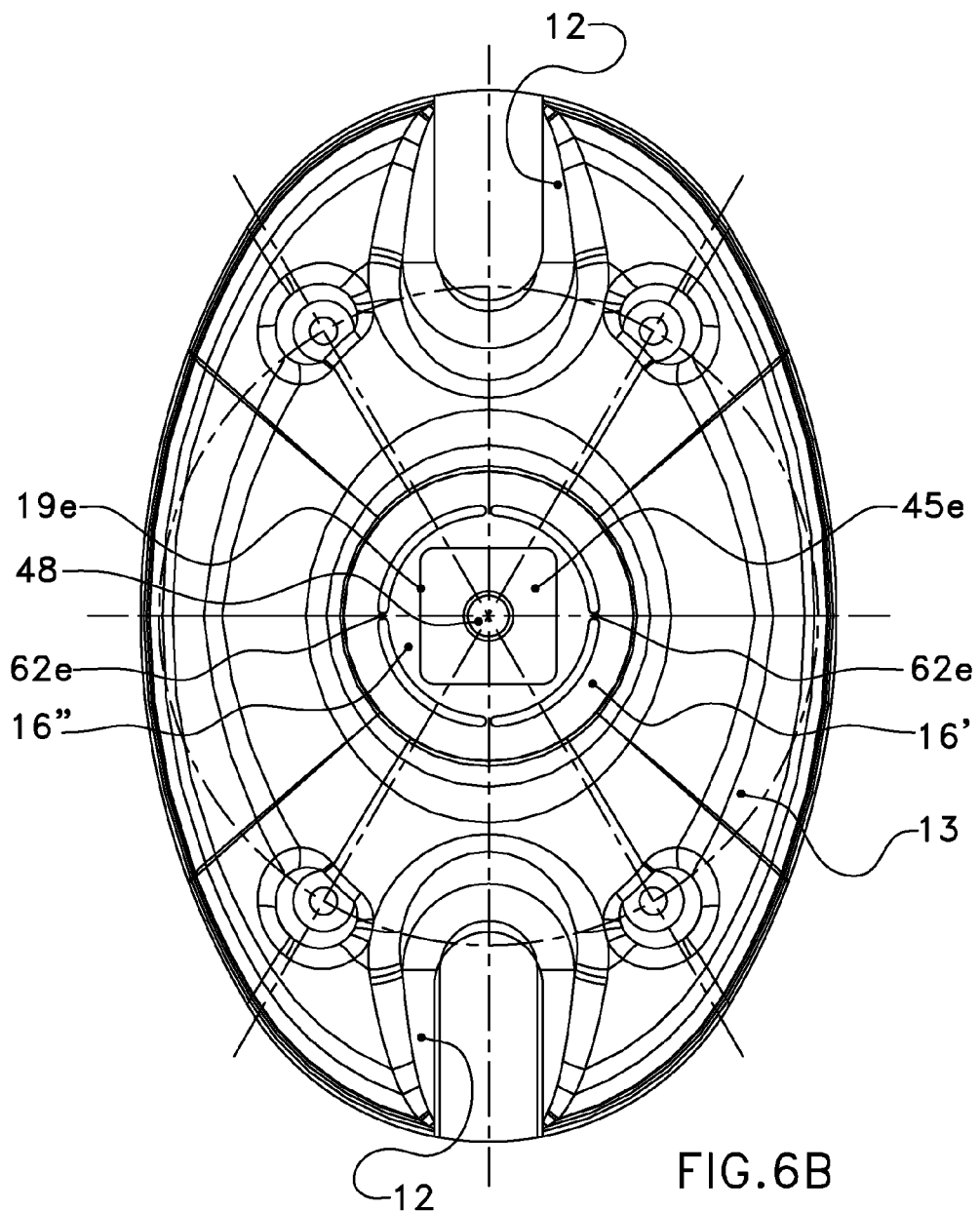
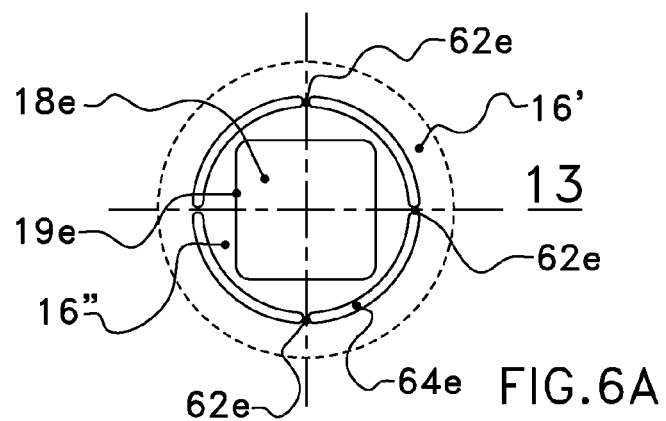
FIG.6B
FIG.6A

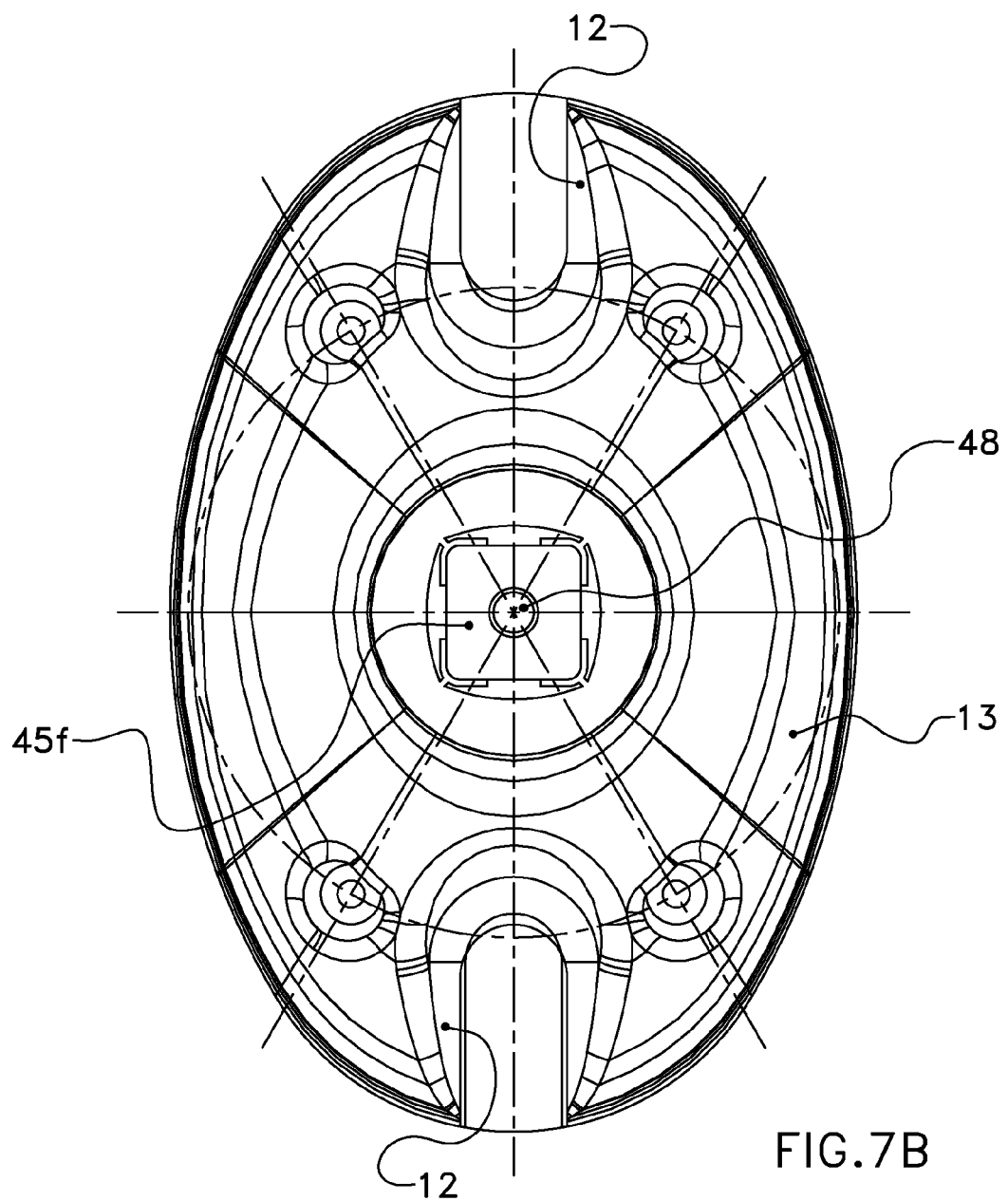
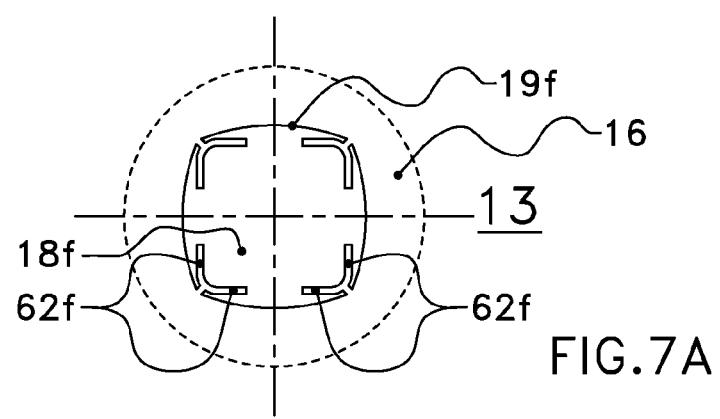
FIG.7B
FIG.7A

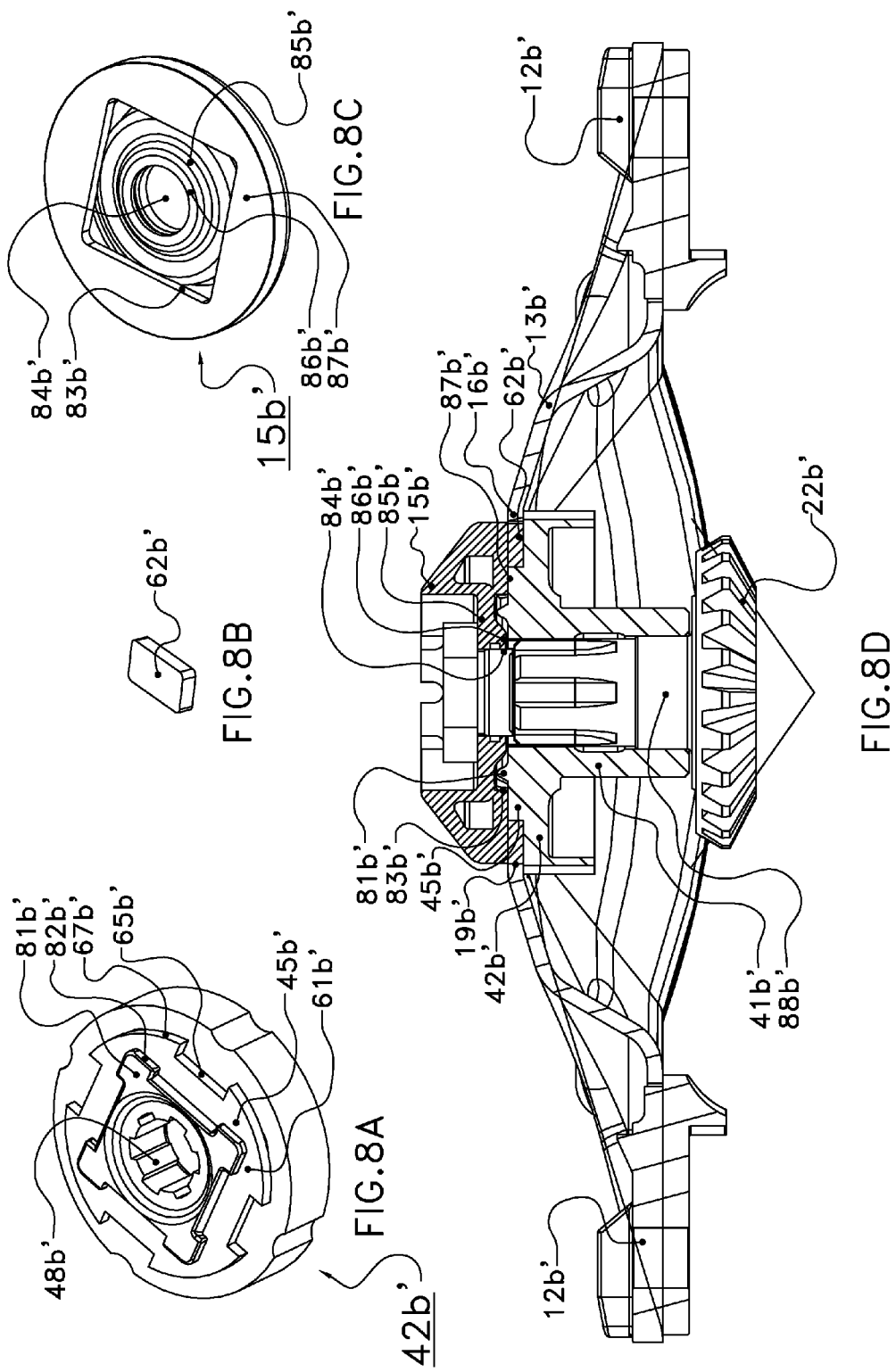

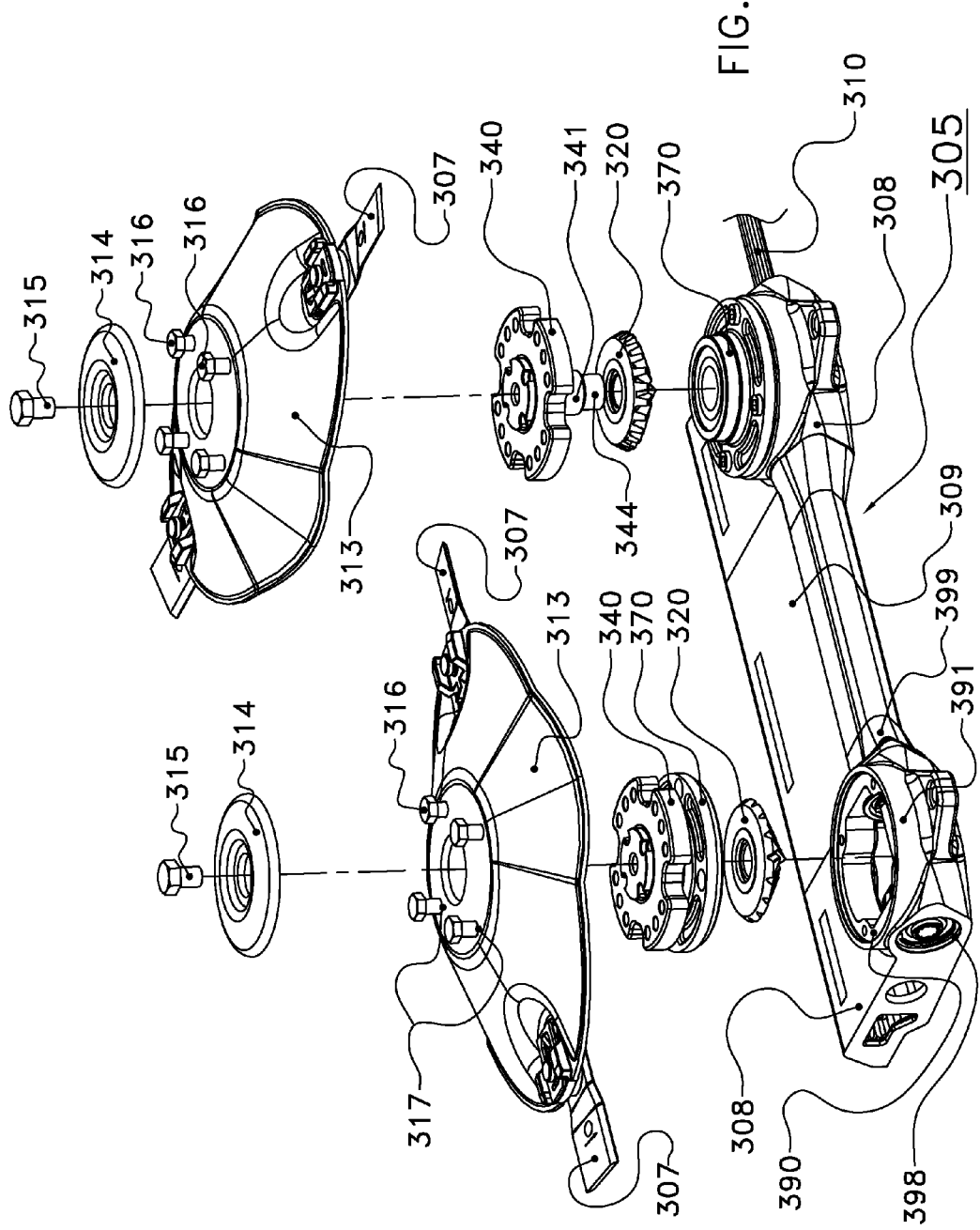

MOWING DEVICE

This application is a continuation of international application no. PCT/NL2008/000249 and claims priority from U.S. provisional application No. 60/987,623 filed on Nov. 13, 2007, and Netherlands application nos. 1034690, 1034691, 1034692 and 1034693 all filed on Nov. 14, 2007, and Netherlands application no. 1035847 filed on Aug. 19, 2008. The contents of all of the foregoing applications are hereby incorporated by reference in their entirety.

BACKGROUND OF THE INVENTION

1. Field of the Invention

The invention relates to a mowing device for crops, and more particularly to a mowing device with a series of knife holders with mowing knives rotated by a drive mechanism coupled to a power take-off or another external drive device.

2. Description of the Related Art

The invention relates to a mowing device for crops, such as grass, comprising a series of knife holders with mowing knives, arranged side by side, which knife holders are rotated about vertical center lines by means of a drive mechanism coupled to a power take-off or another external drive device. In this case, the knife holders are fastened in a rotationally fixed manner on associated hubs which are driven by the drive mechanism.

An example of such a mowing device is disclosed in patent application EP A 0,126,518. In this case, the drive mechanism comprises a drive shaft which extends in the direction of the series of knife holders. For the transmission of the drive shaft to the knife holder there is each time used a case which is provided at one end with a conical gearwheel and which is fastened on the drive shaft. Another conical gearwheel is in engagement with the former gearwheel and has a vertical rotational center line or axis. The other gearwheel forms, together with a hub, a rotatable unit which is bearing-supported in a housing and which supports and rotates the knife holder. In the known device, the knife holder and the hub are interconnected by means of a hood and a single, central nut connection.

In later mowing devices, the knife holder is fastened on a hub flange by means of a plurality of bolts, usually by means of four bolts which are regularly spaced apart in a circumferential direction and which extend through bolt holes into the knife holder and the hub flange. The bolt heads may be protected by means of a hood which is secured on the hub flange by means of a small bolt.

Upon mowing grass mechanically, it is possible to encounter whether or not foreign bodies, such as stones, steel wires, cables, tubes, but also big objects which were left on the spot as waste. This may especially occur in roadsides.

When such a hard, foreign body is hit by mowing knives, overload of the drive mechanism occurs. Replacement of components of the central drive mechanism leads to inadmissible stagnation, and to replacement of less accessible components of the drive elements.

U.S. Pat. No. 4,497,161 discloses a mowing device in which the knife holder is fastened, by means of vertical breaking bolts, on a hub flange which is connected to a central, vertical axis which is rotated. The breaking bolts are upwardly retained by a hood which is fastened on the axis by means of a central bolt. In an alternative embodiment, the hood is resilient and, instead of breaking bolts, there are disposed, between the hub flange and the knife holder, a number of balls which are received in holes in the knife holder and extend into cavities in the hub flange. In the case of an impact of the knives, it will be possible for the balls to move upwardly from the cavities, in which case the hood will deform as well.

Patent application EP 0,774,202 discloses a mowing device in which the knife holder is fastened by means of bolts to an annular hub flange which, by means of a ring that is disposed at the inner circumference of the hub flange, is connected to a vertical axis which is provided at its lower end with a to be driven gearwheel. The ring is axially kept in place by means of a central bolt and a hood. In an embodiment, the ring has inner protrusions which break in the case of an impact, after which the axis does no longer drive the hub flange positively into rotation. To replace the ring the hood may be removed, but, for practical reasons, the hub together with the knife holder will be removed as well, in order to be able to mount the new ring in an easy manner (first ring around vertical axis and then hub around ring) and to be able to remove broken teeth. In this case, there is a risk of penetration of dirt into the bearing.

U.S. Pat. No. 6,675,563 discloses a mowing device which comprises an axially divided hub flange, in which case a knife holder is fastened on the upper hub flange portion by means of bolts and the upper flange portion and the lower flange portion are interconnected by means of a spring loaded ball. In the case of an impact, it is possible for the ball to move axially against spring force in order to enable mutual rotation of both hub flange portions. In this case, the upper hub flange portion will move upwardly as a result of engagement with a central screw thread.

Patent application EP 0,366,580 discloses a mowing device in which the knife holder is fastened on a hub flange by means of bolts, and the hub flange is fixed to a vertical, rotating axis which is provided with a circumferential groove so as to form a weakening. In the case of an impact, the axis will break and the upper part of the axis with the hub flange will come free.

SUMMARY OF THE INVENTION

An object of the invention is to provide a protection against such impacts for a mowing device of the type mentioned in the preamble, wherein a simple replacement of the damaged or collapsed components is possible.

An object of the invention is to provide a protection against such impacts for a mowing device of the type mentioned in the preamble, wherein a quick replacement of the damaged or collapsed components is possible.

An object of the invention is to provide a protection against such impacts for a mowing device of the type mentioned in the preamble, wherein components damaged or collapsed by the impact are easily accessible.

An object of the invention is to provide a protection against such impacts for a mowing device of the type mentioned in the preamble, wherein the hubs, in particular the parts thereof that carry the knife holders, will be saved to a maximum extent in the case of an impact.

An object of the invention is to provide a protection against such impacts for a mowing device of the type mentioned in the preamble, wherein the constructional height of the successive mowing units of the mowing device can be limited.

In order to achieve at least one of these objects, in one aspect, the invention provides a device for mowing crops, comprising a series of mowing units arranged side by side at intermediate distances, the mowing units each comprising a knife holder with at least one knife carrying portion for a mowing knife, and a drive mechanism for the knife holder, the drive mechanism comprising, for each knife holder, a first drive element which comprises a knife holder carrying hub portion and which is drivingly engaged with a second drive element of the drive mechanism to rotatingly drive the knife holder about a vertical center line or axis, wherein the knife holder and the hub portion form a unitary rotatable assembly which, at a position between the knife carrying portion and the hub portion, is provided with a break connection which is effective in a radial direction.

In the case of an impact, the break connection will collapse or give way and it will be possible for the knife holder to rotate relative to the hub and the drive mechanism which is in engagement therewith. The collapsed connection is easily accessible and replaceable, it being possible to keep the hub portion in place. Down-time is thus limited. Unlike a break connection with breaking elements which extend in an axial direction wherein the plane of fracture of the breaking elements will be located in a plane approximately transverse or perpendicular to the center line or axis of rotation (the plane having a normal parallel to the center line or axis), the break connection is effective in a radial direction. Breaking or shifting of the break connection may then, for example, take place in a plane having a normal with a tangential and/or a radial directional component. In this case, a low constructional height may be achieved.

By the term "break connection" is also meant a connection which, in the case of impact forces, is capable of deforming in such a manner that the knife carrying portion and the hub portion no longer form a unitary rotary assembly. The break connection will preferably be arranged to deform by collapsing by breaking.

In order to achieve better accessibility, the break connection may be positioned at a radial outer side of the hub portion or radially outwardly thereof. If the break connection is situated in or near the transition between the knife holder and the hub portion, the construction of the knife holder may also remain completely, or to a large extent, the same as in present designs. In an embodiment, the break connection interconnects the knife holder and the hub portion. The break connection may then constitute part of an added body. This may, for example, be a ring or a hood to be described hereinafter as a retaining element or a pressing element.

In one embodiment, the break connection is situated at the upper side of the hub portion and is thus more easily accessible for mounting or replacement.

The knife holder may form a plate portion above the hub portion. The break connection may then be situated flush with the plate portion.

The plate portion may be provided with an aperture which is concentric with the drive center line, wherein the hub portion is provided with an upper part which extends into the aperture.

In the aforementioned case in which the break connection constitutes part of an added body, it may be a ring, which is preferably flat, in particular does not project above the plate portion of the knife holder, in particular has a thickness which is smaller than or equal to the thickness of the plate portion of the knife holder.

The break connection, in particular in the form of the aforementioned added body, may be situated radially outwardly of the upper part of the hub portion.

In an embodiment thereof, the break connection is effective on the edge of the aperture for the upper part. In a first elaboration thereof, the break connection, by means of one or more breaking elements, extends in a positively locked manner into one or more recesses in the edge of the aperture. In this case, the breaking element/elements may be unitary with one or more centering elements for centering the knife holder relative to the center line/axis, and the upper part of the hub portion. In this case, one circumferential centering element may be present in a first, simple approach.

The centering element or the centering elements may thus be provided on a so-called pressing element which presses the knife holder vertically against the hub portion, wherein the centering element or elements are provided with one or more of the break connections and/or with recesses for the latter.

Alternatively, a plurality of centering elements may be present, which are successive in the direction of rotation and which are each provided with a breaking element.

The break connection may extend, by means of the breaking elements, in a positively locked manner into one or more recesses in the hub portion which then centers the knife holder, or into a centering element for centering the knife holder relative to the center line/axis. Such an embodiment may coincide with the aforementioned embodiment in which the break connection is effective on the edge of the aforementioned aperture.

The breaking elements and/or centering elements may form, in relation to the knife holder and the hub portion, separate components which are easily replaceable.

In general, a break connection which forms a separate component in relation to a knife holder and a hub portion, offers the advantage that the knife holder and the hub portion need not be replaced after an impact.

The aforementioned centering element or elements ensure that, after the break connection has collapsed, there are one or more centering edges left which have the shape of a part of a circle and are concentric with the center line, so that the knife holder continues to be centered relative to the hub and instability is counteracted during the further rotation of the hub portion.

It is also possible for the break connection to be located in the material of the knife holder, so that it is possible to economize on components. The break connection may thus comprise breaking elements which are unitary with an inner portion that is radially located at the inside thereof, to mount the knife holder on the hub portion.

It is further possible for the break connection to comprise breaking elements which are unitary with the edge of the aperture, which breaking elements engage with the upper part of the hub portion. In this case, at least part of the knife holder should be replaced after an impact.

Alternatively, in an embodiment, the radial break connection may comprise one or more radial breaking elements which radially extend from a first edge which is concentric with the center line and engages with a second edge which is concentric therewith and which is provided with recesses matching the breaking elements, wherein the first edge, the second edge, respectively, permanently forms a rotationally fixed unit with the hub portion, and the second edge, the first edge, respectively, permanently forms a rotationally fixed unit with the knife carrying portions. After the break connection has collapsed, the stability of the knife holder part having the knife carrying portions relative to the hub flange is promoted by both edges which then form a sort of bearing for one another, in which case the knife holder continues to be centered.

The breaking portions may be directly provided in the material of the hub portion and/or the knife holder, or be provided on one or more added components, such as a ring that is disposed on a square hub portion. The breaking elements may also form added components which are placed in co-operating recesses in the hub portion and the knife holder.

The first or second edge may be formed by the material of the knife holder or hub portion itself, or by one or more added components, such as a ring.

In an embodiment having a low constructional height, the first drive element comprises a gearwheel which is in engagement with the second drive element, a hub flange and a hub axis, wherein the hub axis is unitary with the hub flange or with the gearwheel and extends therefrom downwardly, upwardly, respectively, and is directly attached to the gearwheel, the hub flange, respectively. In this case, the hub axis may extend into the gearwheel, the hub flange, respectively.

From a further aspect, the invention provides a device of the type mentioned in the preamble, wherein the knife holder and the hub portion form a unitary rotatable assembly which, at a position between the knife carrying portion and the hub portion, is provided with a break connection that is provided by means of a hood disposed against the upper side of the knife holder, which hood is provided with breaking elements that extend downwardly in an axial direction and are fittingly received in recesses in the hub portion and in the knife holder. The collapsing of the break connection then takes place in a plane perpendicular to the center line or axis of rotation. The breaking elements, which may, for example, have the shape of arms or fingers, may in this case fittingly extend through holes in the knife holder and fittingly extend into holes in the hub portion that are located there below. The hood may be axially fastened on the hub portion by means of a bolt, whilst keeping the knife holder, against axial displacement thereof, between the hood and the hub portion.

From a further aspect, the invention provides a device of the type mentioned in the preamble, wherein the knife holder and the hub portion form a unitary rotatable assembly, which is provided with a break connection in the form of a weakening in the material of the hub portion, wherein the knife holder and the hub portion are provided with first and second edges which engage with each other in a concentric manner relative to the center line and, after the break connection has collapsed, provide each other a guide means for rotation about the center line. After the break connection in the material of the hub portion has collapsed, instability of the knife holder as regards its rotation is counteracted.

If the hub portion comprises a hub flange, on which the knife holder is supported, the weakening may be provided in the material of the hub flange. The weakening may bound an area of the hub flange, in which a fastening means, such as a bolt hole, is provided. Alternatively, the weakening may comprise a breakaway protrusion, in particular a radial protrusion, which is fittingly received in a recess in the knife holder.

From a further aspect, the invention provides a device of the type mentioned in the preamble, wherein the knife holder and the hub portion form a unitary rotatable assembly which is provided with a break connection in the form of a weakening in the material of the knife holder. The weakening may interconnect two knife holder portions which are located concentrically with each other and which, after the weakening has collapsed, are located in a manner in which they fit into each another, so that the centering is maintained. Alternatively, the weakening may comprise a breakaway protrusion, in particular a radial protrusion, which is fittingly received in a recess in the hub portion.

When use is made of a so-called pressing element to keep or tighten the knife holder or parts thereof in an axial direction against the hub portion, or to prevent the knife holder from leaving the hub portion in an upward direction, the pressing element may be mounted on the hub portion by means of an added screw thread connection. In this case, the pressing element is tightened against the knife holder by means of a screw bolt that extends through the pressing element and into the hub portion, or by means of a nut screwed on a threaded end that extends upwardly from the hub portion. When the parts of the knife holder that are obstructed by the obstacle engage with the pressing element, hereinafter to be called retaining element, in the case of continuous rotation of the hub portion by engagement of the retaining element with the bolt or nut, the screw thread connection will be tighter or looser. In the former case, demounting will be impeded, in the latter case, the environment will be endangered.

In order to prevent this, the invention provides, from a further aspect, a retaining element to tighten the knife holder against the hub portion in an axial direction, wherein the retaining element is connected to the hub portion by means of an added screw thread connection, wherein the retaining element and the hub portion are provided with means to prevent mutual rotation about the center line.

In this case, the retaining element may comprise a collar which fittingly extends between the knife holder and the hub portion and is provided with a protrusion which extends into a recess in the knife holder or is provided with a recess for receiving a protrusion on the knife holder or an added connecting element, wherein the protrusion, the added connecting element, respectively, is breakable to form the break connection. In a simple embodiment, the protrusion, the recess, respectively, is formed onto a flange of the collar. The flange may form a centering edge for the knife holder. The protrusion is preferably formed onto the retaining element, so that in the case of breakage only the retaining element has to be replaced.

In an embodiment, the retaining element, during normal operation, axially presses against the knife holder at radial positions inside the break connection. The retaining element may be provided with a portion which extends over the knife holder part that is radially located outside the break connection, in order to keep (the parts of) the knife holder that are radially located outside the break connection, on the device.

The hub portion may, as described in the foregoing, have an upper part which, in a simple embodiment, is girdled by the retaining element. In the case of the aforementioned plate portion of the knife holder, said plate portion may have a thickness which is smaller than the height of the aforementioned upper part, so that sufficient space is provided for engagement by the retaining element.

From a further aspect, the invention provides a device for mowing crops, comprising a series of mowing units arranged side by side at predetermined distances, which mowing units each comprise a knife holder with at least one knife carrying portion for a mowing knife, and a drive mechanism for the knife holder, which drive mechanism comprises, for each knife holder, a first drive element which comprises a knife holder carrying hub portion and which is drivingly engaged with a second drive element of the drive mechanism to rotatingly drive the knife holder about a vertical center line, wherein the device is provided with a retaining element to keep or tighten the knife holder or parts thereof in an axial direction against the hub portion, or to prevent the knife holder from leaving the hub portion in an upward direction, wherein the knife holder and the hub portion form a unitary rotatable assembly which, at a position between the knife carrying portion and the hub portion, is provided with a break connection, wherein the break connection is provided in material of the retaining element, in particular in the form of a protrusion which fits into a recess in the knife holder. The break connection is preferably effective in a radial direction, as mentioned in the foregoing.

From a further aspect, the invention provides a device for mowing crops, comprising a series of mowing units arranged side by side at predetermined distances, which mowing units each comprise a knife holder with at least one knife carrying portion for a mowing knife, and a drive mechanism for the knife holder, which drive mechanism comprises, for each knife holder, a first drive element which comprises a knife holder carrying hub portion and which is drivingly engaged with a second drive element of the drive mechanism to rotatingly drive the knife holder about a vertical center line, wherein the device is provided with a retaining element to keep or tighten the knife holder or parts thereof in an axial direction against the hub portion, or to prevent the knife holder from leaving the hub portion in an upward direction, wherein the knife holder and the hub portion form a unitary rotatable assembly which, at a position between the knife carrying portion and the hub portion, is provided with a break connection, wherein the break connection is provided by means of added breaking elements which fit into recesses in the retaining element and in the knife holder. The break connection is preferably effective in a radial direction, as mentioned in the foregoing.

In the mowing device shown in EP A 0,126,518, the knife holders are formed by a hat-shaped, circular plate which is provided with mowing knives at two opposite positions near the edge. These mowing knives are per se freely rotatably attached to said edge. In the region of their high located middle, the knife holders are mounted on the hub which is rotatably bearing supported in a construction in which the hub, via a gearwheel which is connected thereto in a rotationally fixed manner, is drivingly engaged with a gearwheel which is at right angles thereto and which is provided on a case which forms a rotatable unit with a drive shaft. The case is bearing-supported at both of its ends in a housing on which the construction is supported. Housings of successive knife holder arrangements are interconnected by intermediate sleeves through which the drive shaft extends. The intermediate sleeves have conical ends, mounting rings being provided between said ends and the housing.

In later embodiments, the knife holder is more elliptically designed, the knives being mounted at positions on the imaginary main axis of the ellipse. In this case, the knives have an effective length in the order of 10 cm.

When such a hard, foreign body is hit by mowing knives, the knife should be able to rotate inwardly against the centrifugal forces in order to prevent overload; in this case, however, it will possibly collide with the housing or the construction. In order to prevent such collisions, fixed stops have been provided at the radial inside, at the lower side of the knife holders, in order to prevent the knives from rotating too far inwardly.

However, the problem remains that the inwardly rotating knife hits a hard surface and may be damaged as a result thereof, which leads to early replacement.

A further object of the invention is to improve therein by means of a mowing device of the type mentioned in the preamble, whilst maintaining a sufficiently effective length of the mowing knives.

From a further aspect, the invention provides a device for mowing crops, comprising a series of mowing units arranged side by side at predetermined distances, which mowing units each comprise a knife holder with at least one knife carrying portion for a mowing knife, and a drive mechanism for the knife holder, which drive mechanism comprises a first drive element for each knife holder, which drive element comprises a knife holder carrying hub portion and which is drivingly engaged with a second drive element of the drive mechanism to rotatingly drive the knife holder about a vertical center line, wherein the knife holder and the hub portion form a unitary rotatable assembly, wherein the first drive element comprises a first gearwheel which forms a rotatable unit with the hub portion, wherein the drive mechanism further comprises a rotatingly driven drive shaft for the mowing knives in common, which substantially extends in the direction of said series through interconnected housings of the mowing units and is bearing-supported therein and is couplable to an external drive device, such as a power take-off of a tractor, wherein the second drive element comprises a second gearwheel which forms a rotatable unit with the drive shaft and forms, together with the first drive element, a transmission, bearing-supported in a relevant housing, to drive the hub assembly, wherein the mowing knife, about a knife center line which is at least substantially parallel to the rotational center line/axis, is attached to the edge of the knife holder in the region of the knife carrying portion, in a manner in which it is freely rotatable about the knife center line, wherein, when viewed in the rotational plane of the mowing knife, the radial distance between the knife center line and the radial external surface of the housing is greater than the distance between the knife center line and the knife end, over the entire rotation.

In said mowing device, in the case of impact with a foreign body, it is thus possible for the knives always freely to rotate inwardly at any position of their rotation, without colliding with fixed components of the mowing device.

It is pointed out that Dutch patent application 74,07450 discloses a mowing device comprising a hub portion provided with arms that are unitary with said hub portion, knives being fastened at the ends of said arms by means of a bolt about which they are able to pivot.

In a further embodiment, the hub portion comprises a hub flange which carries the knife holder and which is co-axial with the first gearwheel, wherein the hub flange and the first gearwheel are rotationally fixed interconnected and the first drive element forms, between the first gearwheel and the hub flange, an axial body which is single when viewed in a radial direction, wherein the housing comprises a construction with a circumferential wall, wherein bearings are provided between the circumferential wall of the construction and the axial body. Owing to this, a slender embodiment of the hub assembly within said bearings is possible, so that the external diameter of the bearings can be kept limited, and the external radial dimensions of the construction can be kept limited as well. There is thus provided space for rotational motion of the knife about the knife center line.

The axial body may at least partially be formed onto the hub flange.

In an embodiment, wherein the drive shaft, between successive mowing units, is received in sleeves or tubes which interconnect the housings of the mowing units, the sleeve ends at the end edge are formed so as to have a circumferential stair whose axial portion closely fits into the entrance of the borehole of the housing and whose radial portion abuts against the edge of the entrance of the borehole of the housing. The sleeve end thus closely fits, by means of a collar serving as a mounting means, in/against the entrance of the housing. A mounting ring, which would otherwise increase the length of the housing in the direction of the drive shaft, is absent. Said dimension of the housing can thus be kept limited, so that at a constant diameter of the rotational path of the knife center lines there is realized more radial space for rotation of a knife about the knife center line.

In a further development, the second gearwheel is provided on an end of a case which is fitted in a rotationally fixed manner on the drive shaft, wherein the case is bearing supported in a shaft bearing, wherein the end edge of the sleeve end forms an axially orientated head edge which extends to near the shaft bearing. In this case, there may even be decided not to mount a bearing-retaining ring, such as a Seeger ring, which does have been used in the arrangement of EP A 0,126,518.

In a manner known per se, both ends of the case may be bearing supported in a shaft bearing.

In a further embodiment, the sleeve ends, at the upper side, behind the end edge, externally form a stair or a straight shoulder, so that there is provided space for rotation of the knives.

The distance between the knife center line and the knife end may amount to approximately 1 dm or more.

When a hard, foreign body is hit by mowing knives, one or a plurality of the bolts by means of which the knife holder is fastened on the hub flange may break. In this case it may occur, as a result of deformation of the bolts or a bolt hole, that it is impossible to remove the bolts by hand or by means of a simple tool. In this case, the user of the mowing device is unable to replace the bolts on the spot, on site, and will have to interrupt mowing in order to replace the bolts in a workplace. This is very time-consuming.

In this context, the invention provides, from one aspect, a device for mowing crops, comprising a series of mowing units arranged side by side at predetermined distances, which mowing units each comprise a knife holder with at least one knife carrying portion for a mowing knife, and a drive mechanism for the knife holder, which drive mechanism comprises, for each knife holder, a first drive element which comprises a knife holder carrying hub portion and which is drivingly engaged with a second drive element of the drive mechanism to rotatingly drive the knife holder about a vertical center line, wherein the knife holder and the hub portion form a unitary rotatable assembly, wherein the hub portion and the knife holder, respectively, are provided with a number of first connection holes and a number of second connection holes, wherein each first connection hole forms a pair with an associated second connection hole, wherein, within each pair, both holes are in alignment for occupation by a connecting means for connection of the knife holder to the hub portion, wherein, in use, at least one of the pairs of first and second connection holes is unoccupied.

The invention further provides a device for mowing crops, comprising a series of mowing units arranged side by side at predetermined distances, which mowing units each comprise a knife holder with at least one knife carrying portion for a mowing knife, and a drive mechanism for the knife holder, which drive mechanism comprises, for each knife holder, a first drive element which comprises a knife holder carrying hub portion and which is drivingly engaged with a second drive element of the drive mechanism to rotatingly drive the knife holder about a vertical center line, wherein the knife holder and the hub portion form a unitary rotatable assembly, wherein the hub portion and the knife holder, respectively, are provided with a number of first connection holes and a number of second connection holes, which are per pair in alignment for occupation by a connecting means for connection of the knife holder to the hub portion, wherein the pairs of first and second connection holes are provided in excess numbers.

Owing to the fact that the connection holes are provided in excess numbers, it will be possible to utilize at least one, still free connection possibility. In the case of a bolt connection, the user only has to mount a new bolt into the free connection holes and to secure it by means of a nut or by screwing. The broken bolt need not be replaced. The mowing process can be resumed after only a short delay.

The first and/or second connection holes may be designed as screw bolt holes.

It is possible to maintain an optimum fastening of the knife holder on the hub also after a collapsed bolt has got jammed, if at least one extra, ready pair has been added to each pair of used first and second connection holes, in order to form a group. In this case, there is a possibility of substitution for any used bolt position.

In a further elaboration thereof, in each case two extra, ready pairs of first/second connection holes have been added to a used pair. Should the new connection also collapse, and not be releasable, it is possible to continue the mowing process by utilizing the still free pair. The two extra, ready pairs may be located on both sides of the used pair, when viewed in the direction of rotation.

The first and second connection holes may be spread in groups, when viewed in a cutting plane perpendicular to the rotational center line. They may also be regularly spread.

In the case of the mowing device shown in the aforementioned document EP 0,126,518, which is provided with a drive shaft that extends in the direction of said series of mowing units, for the right-angled transmission of the drive shaft to the knife holder there is used in each case a drive element that is an assembly consisting of a conical gearwheel, an upright pin which has a straight longitudinal toothing (e.g. a spline or projecting shaft toothing), extends upwardly and fittingly through a case provided with a hub flange and which, at its upper end, has a screw thread in order to secure there the hub flange and the knife holder on the pin, with the aid of a nut and by means of a strong hood. The assembly of hollow shaft and pin is bearing-supported in a stationary housing by means of two radial bearings. The lower bearing is supported on an edge of the second gearwheel. The hub flange extends over the upper bearing.

The known arrangement is voluminous in horizontal and vertical directions. In a horizontal direction because of the engagement of the pin that projects from the gearwheel and the hollow shaft. In a vertical direction the hood and the nut form a considerable elevation on the knife holder. This limits the height of the area above the knife holders, which is covered upwardly by a general hood of the mowing device. This area is used for cut grass moving from the front side of the mowing device to its rear side. This movement is impeded by the elevation.

The known arrangement is complex, so that assembly may be time-consuming

One object of the invention is to provide a mowing device of the type mentioned in the preamble, in which the gearwheel-knife holder connection is simple.

One object of the invention is to provide a mowing device of the type mentioned in the preamble, in which the gearwheel-knife holder connection can be pre tightened in a simple manner.

One object of the invention is to provide a mowing device of the type mentioned in the preamble, in which the gearwheel-knife holder connection can have a limited volume in a vertical sense.

One object of the invention is to provide a mowing device of the type mentioned in the preamble, in which the gearwheel-knife holder connection can have a limited volume in a horizontal sense.

From one aspect, the invention provides a device for mowing crops, comprising a series of mowing units arranged side by side at predetermined distances, which mowing units each comprise a knife holder with at least one knife carrying portion for a mowing knife, and a drive mechanism for the knife holder, which drive mechanism comprises, for each knife holder, a first drive element which comprises a knife holder carrying hub portion and which is drivingly engaged with a second drive element of the drive mechanism to rotatingly drive the knife holder about a vertical center line or axis, wherein the first drive element is bearing-supported by means of at least one bearing in a housing of the mowing unit and comprises a gearwheel, wherein the hub portion and the gearwheel, respectively, are provided with first and second screw thread portions formed thereon and co operating with each other, for mutual fastening, by means of which the hub portion and the gearwheel are pre tightened towards each other.

It is thus possible to perform at least substantially immediately the hub portion-gearwheel fastening against mutual rotation and mutual axial displacement. For this connection, it is possible to omit an added bolt-nut connection between these two components, so that the constructional height can be kept limited. During normal operation the connection is rotationally fixed. In the case of impact of the knife against an obstacle, it will be possible, by pre tightening in one direction of rotation of the knife holder, to prevent said two components from mutually rotating to a looser mutual position. The desired degree of pre tightening can subsequently be calculated.

In particular, if an angular contact bearing is used, it will be possible for the hub portion and the gearwheel to clamp the bearing between them. Upon pre tightening, the maximum moment that the used bearing can bear is also taken into account.

The fastening may be achieved fastening independently of the occurring deviations in size. If desired, it is also possible to set in this manner the vertical position of the knife holder.

In a simple embodiment, the hub portion, in particular in the form of a hub flange, or the gearwheel is unitary with a pin which has one end provided with first or second fastening means, such as an external screw thread, wherein the gearwheel or the hub portion is provided with matching second or first connecting means, such as a hole having an internal screw thread.

From a further aspect, the invention provides a device for mowing crops, comprising a series of mowing units arranged side by side at intermediate distances, which mowing units each comprise a knife holder with at least one knife carrying portion for a mowing knife, and a drive mechanism for the knife holder, which drive mechanism comprises, for each knife holder, a first drive element which comprises a knife holder carrying hub portion and which is drivingly engaged with a second drive element of the drive mechanism to rotatingly drive the knife holder about a vertical center line, wherein the first drive element comprises a gearwheel which is in engagement with the second drive element, wherein the second drive element is mounted on a common, rotatingly driven drive shaft which substantially extends in the direction of said series and is couplable to an external drive device, such as a power take-off of a tractor, wherein the first drive element is bearing-supported by means of at least one bearing in a housing of the mowing unit, wherein the hub portion and the gearwheel, respectively, are provided with first and second screw thread portions formed thereon and co operating with each other, for direct mutual fastening.

It is pointed out that Dutch patent application 74,07450 discloses a mowing device, wherein the main drive mechanism consists of a gearwheel train, wherein at the position of each mowing unit one of the gearwheels is screwed on the lower end of a pin which is unitary with a hub and is bearing-supported by means of bearings in a housing of the mowing unit. In this case, the gearwheel is not used as a tightening means.

The aspects and features described in this description and the claims of the application and/or shown in the figures of this application may, where possible, also be used separately from each other. These separate aspects may be the subject of split patent applications aimed at them. This holds in particular for the features and aspects which are described per se in the dependent claims.

BRIEF DESCRIPTION OF THE DRAWINGS

The invention will be explained with reference to a number of exemplary embodiments shown in the accompanying figures, in which:

FIG. 2 is an isometric and partially cut-away view of part of a mowing unit of the mowing device of FIG. 1, in a first embodiment;

FIGS. 2A and 2B, respectively, are an oblique view of a breaking plate and a cross-sectional view of a mowing unit of the embodiment according to FIG. 2;

FIGS. 3A and 3B, respectively, are a detailed view of a first alternative embodiment of a break connection according to the invention and a top view of a knife holder and a hub portion provided with said break connection;

FIG. 4C is an alternative for the embodiment of FIG. 4a;

FIGS. 5A and 5B, respectively, are a detailed view of a third alternative embodiment of a break connection according to the invention and a top view of a knife holder and a hub portion provided with said break connection;

FIGS. 6A and 6B, respectively, are a detailed view of a fourth alternative embodiment of a break connection according to the invention and a top view of a knife holder and a hub portion provided with said break connection;

FIGS. 7A and 7B, respectively, are a detailed view of a fifth alternative embodiment of a break connection according to the invention and a top view of a knife holder and a hub portion provided with said break connection;

FIGS. 8A-D, respectively, are an oblique top view of a hub portion suitable for the embodiment of FIG. 3C, a breaking element for it, a bottom view of a pressing element for retaining a knife holder on the hub portion, and a vertical cross-sectional view of a mowing unit comprising those components;

FIG. 11, respectively, is an isometric and partially cut away view of part of a mowing unit of another embodiment of a mowing device according to the invention;

DESCRIPTION OF ILLUSTRATIVE EMBODIMENTS

Figure 1:
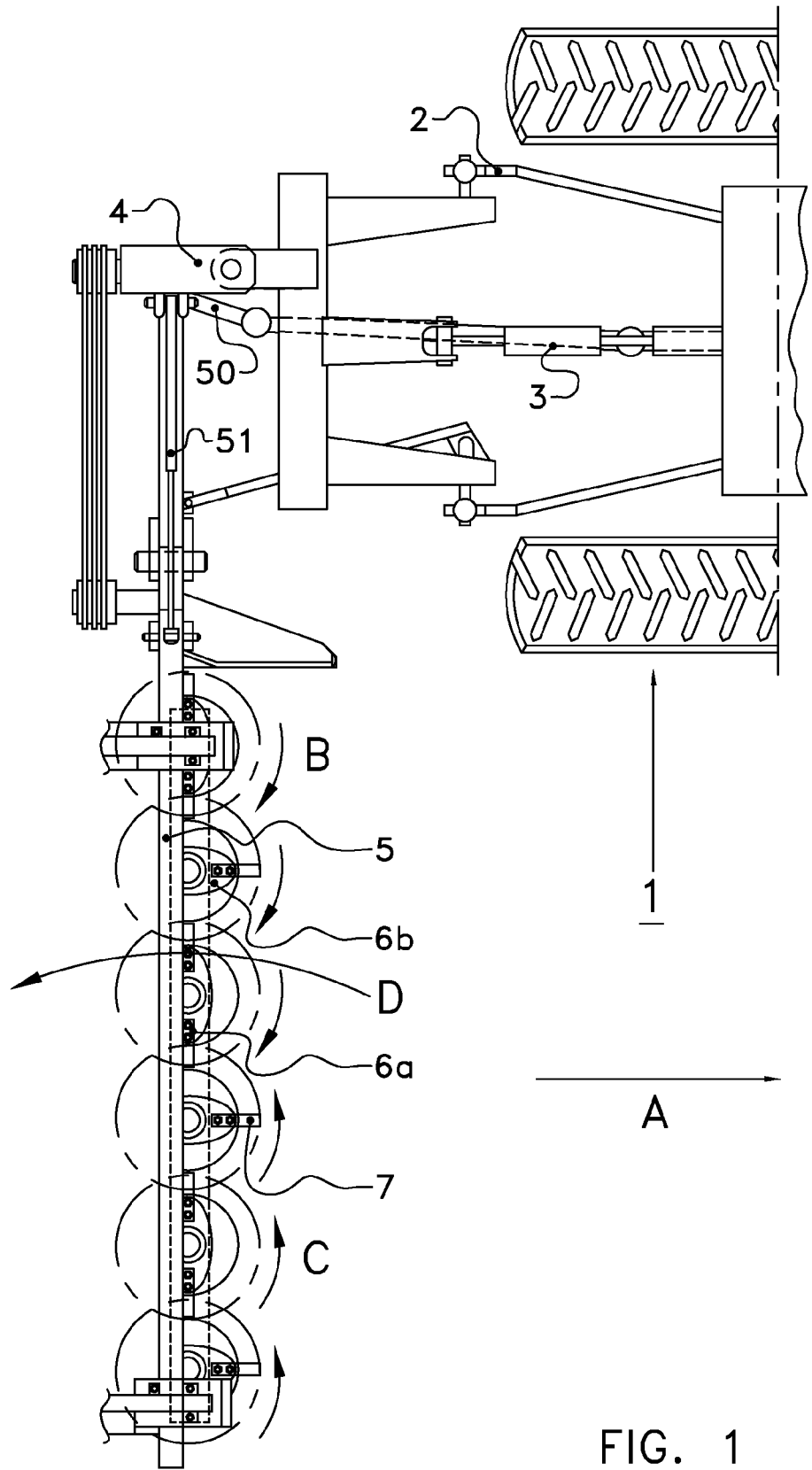
FIG. 1 is a diagrammatic top view of an exemplary embodiment of a mowing device according to the invention, coupled to a tractor.

The following is a description of certain embodiments of the invention, given by way of example only and with reference to the drawings. FIG. 1 shows the tractor 1, having a three-point suspension 2 and a power take-off 3. A cutter bar support 4 is fastened to the three-point suspension 2, the power take-off 3 being connected to the drive mechanism 51 via the drive element 50. The cutter bar 5 is fastened on the drive mechanism 51 and the cutter bar support 4. The cutter bar 5 carries a series of oval mowing discs or knife holders 6a, 6b, which are in succession arranged so as to be rotated over 90° and comprise a knife holder hood 13 (FIG. 2) which has at its edge knife carrying portions 12 for two, oppositely located, knives 7. During operation, the tractor 1 will move in the direction A. The knife holders 6a, 6b may, for example, be rotated in the directions B, C, respectively.

Figure 2B:
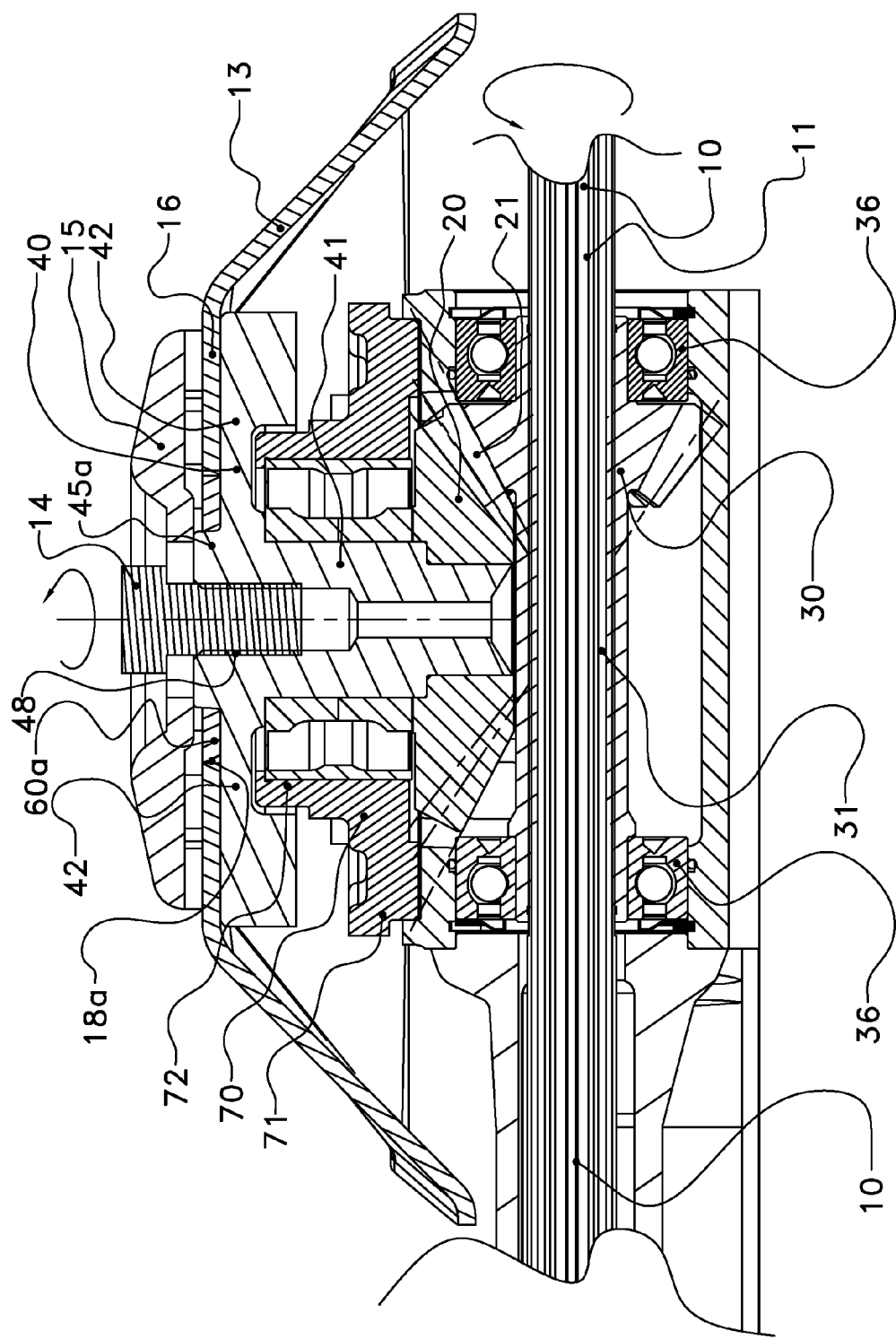

FIG. 2 shows that the cutter bar 5 is composed of modules, in this example of drive housings 8 with intermediate housings 9 disposed between them. The housings 8 and 9 are tightened against each other by means of a drawbar, not shown, which extends in a longitudinal direction. A drive shaft 10 also extends through the housings 8, 9, which drive shaft, at the position of each drive housing 8, is drivingly engaged with a conical gearwheel 30 (see for example FIG. 2B).

A first drive element comprises a conical gearwheel 20 and a hub portion 40. The gearwheel 20 is fastened in a substantially axially fixed and rotationally fixed manner to a pin or shaft 41 of the hub portion 40, see FIG. 2B. The shaft 41 is provided with an axial screw threaded borehole 48. The hub portion 40 further comprises a flange 42 which is unitary with the shaft 41 and is provided at its upper side with an elevated portion 45a. The gearwheel 20 of the first drive element is drivingly engaged, by means of the toothing 21, with the conical gearwheel 30 which forms a second drive element.

The first drive element of hub portion 40/gearwheel 20 is rotatably bearing-supported within hollow shaft or construction 70 which is fixed to the drive housing 8 by means of the flange 71. Furthermore, bearings, not further shown, are disposed between the case 72 of the construction 70 and a pin 41 of the hub portion 40.

By means of a central bolt 14 screwed into the borehole and a pressing hood 15, the knife holder 6a, 6b, together with the knife holder hood 13, is secured in an axial direction on the flange 42 and bears in this case by means of the central plate or knife holder hood central plate portion 16 on the upper surface of the flange 42. In the central plate portion 16 there is provided a passage 18a which has radial recesses 19a in the circular edge 66a. The thickness of the hood portion 16 corresponds to the height of the elevated portion 45a of the flange 42.

In this case, the break connection is formed by a breaking plate or breaking ring 60a (see FIG. 2A) which forms a ring 61a having a hole 64a and which is provided with radial outward protrusions 62a that protrude from the circular edge 67a and with radial inward protrusions 63a that protrude from the circular edge 68a. The protrusions 62a and/or 63a are connected to the rest of the ring 61a via target positions of breaking and then form breaking elements. The ring 61a closely fits into the passage 18a in the knife holder hood 13, and the protrusions 62a fit into congruent recesses 19a. The protrusions 63a fit into congruent, radial recesses 65a which are formed in the elevated portion 45, 45a of the flange 42, which elevated portion has a circular edge 69a. In this case, the hole 64a fits around the elevated portion 45a and functions as a centering element for the knife holder hood 13 relative to the rotational center line of the hub portion 40. The edges 66a, 67a, 68a and 69a are located concentrically with each other.

When a knife 7 hits an obstacle, overload of central and more remote parts of the drive mechanism is prevented by breaking of the protrusions 62a and/or 63a. Mutual engagement by the edges 66a and 67a or the edges 68a and 69a ensures that the knife holder will remain centered. Axial separation of the knife holder 6 and the hub portion 40 is prevented by the hood 15. After the breaking the hood 15 can be removed and the ring 61a can be replaced.

Alternatively, the protrusions may be provided on the knife holder hood 13 and/or the elevation 45/45a of the hub portion 40, in which case the ring is provided with matching recesses. In this case, these protrusions are connected to the hood/hub portion in a manner in which they can be broken off In this case, however, the knife holder hood 13 and/or the hub portion 40 should be replaced. In a further alternative, the ring is absent and the knife holder hood 13 and the hub portion 40 are provided with matching radial protrusions and recesses and with mutually engaging concentric circular marginal areas. Also in this case, the knife holder hood or the hub portion should be replaced. The mentioned ring 61a does form an extra component, but enlarges the chance that the knife holder hood 13 and the hub portion 40 need not be replaced.

The embodiment shown in FIGS. 3A and 3B corresponds to a large extent to the embodiment of FIG. 2, wherein the shape of the elevated portion 45b now has an unround section, and for the break connection there is used an assembly 60b, comprising four breaking elements or strips 62b of a material having a lower breaking strength than the material of the elevated hub portion 45b. Here, the elevated portion 45b functions as a centering element. At its circumference the hub portion 45b is provided with recesses 65b which are located between circular marginal areas 69b. The central portion 16 of the knife holder hood 13 is provided with a passage 18b whose edge is provided with recesses 19b located between circular marginal areas 66a. In the mounted state of FIG. 3B, the breaking elements 62b exactly fit into the holes formed by the oppositely located recesses 65b and 19b.

When a knife 7 hits an obstacle, overload of central and more remote parts of the drive mechanism is prevented by collapsing of the breaking elements 62b. Mutual engagement by concentric edges 66b and 69b in the shape of a part of a circle ensures that the knife holder will remain centered. Axial separation of the knife holder 6 and the hub portion 40 is prevented by the hood 15. After the breaking the hood 15 can be removed and the breaking elements 62b can be replaced. A comparable arrangement is shown in FIGS. 8A-D which will be described hereinafter.

Figure 4A:
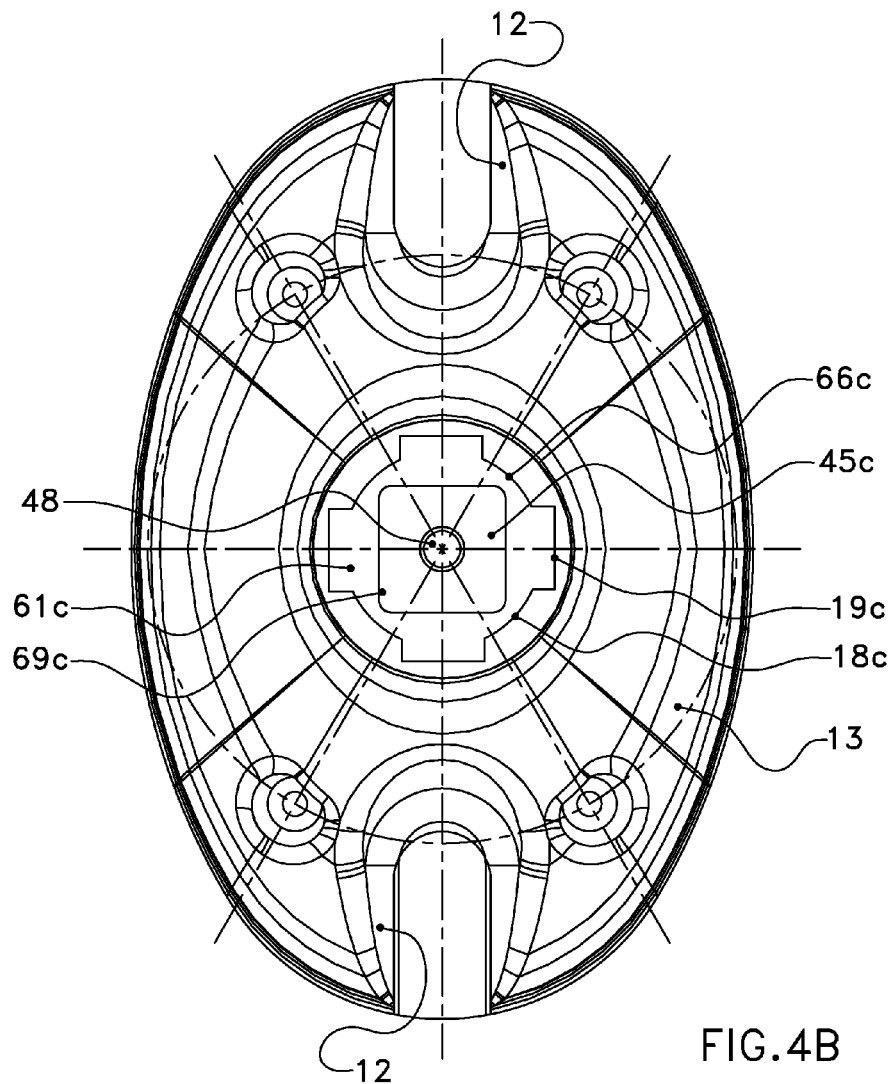
FIGS. 4A and 4B, respectively, are a detailed view of a second alternative embodiment of a break connection according to the invention and a top view of a knife holder and a hub portion provided with said break connection.
Figure 4B:
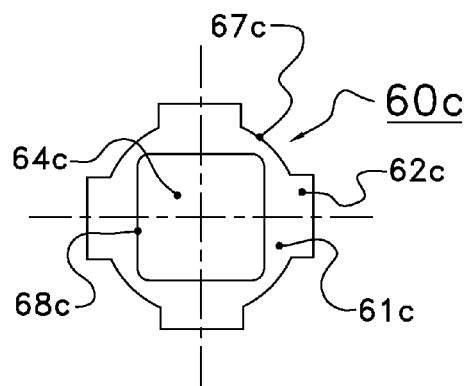

In the embodiment shown in FIGS. 4A and 4B, the elevated portion 45c has the shape of a square section and has an edge 69c, and for the break connection there is used a component

60c which is formed as a ring 61c having four protrusions 62c located between marginal areas 67c having the shape of a part of a circle, which protrusions function as breaking elements 62c. The ring 61c forms a central hole 64c having an edge 68c, which exactly fits on/around the elevated portion 45c, provided with the edge 69c, in order to center the ring 61c and thus the knife holder relative to the rotational center line. The central portion 16 of the knife holder hood 13 is provided with a passage 18c whose edge is provided with recesses 19c located between marginal portions 66c which have the shape of a part of a circle. In the mounted state of FIG. 4B, the breaking elements 62c exactly fit into the recesses 19c.

When a knife 7 hits an obstacle, overload of central and more remote parts of the drive mechanism is prevented by collapsing of the breaking elements 62c. Mutual engagement by concentric edges 66c and 67c which have the shape of a part of a circle ensures that the knife holder will remain centered. Axial separation of the knife holder 6 and the hub portion 40 is prevented by the hood 15. After the breaking the hood 15 can be removed and the ring 61c can be replaced.

Figure 4C:
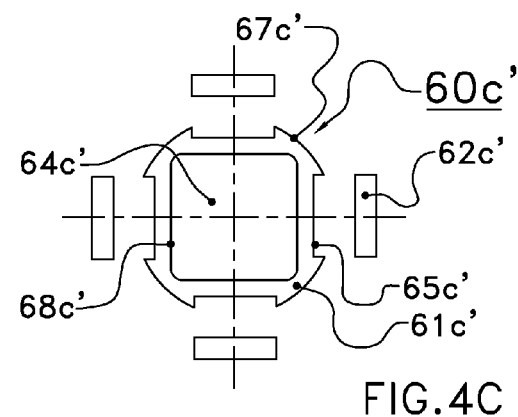

The embodiment shown in FIG. 4C corresponds to a large extent to that of FIGS. 4A and 4B, with this difference that the breaking elements 62c' now form separate parts of the ring 61c'. The ring 61c' is provided with a number of recesses 65c' for the breaking elements 62c'. In this case, the breaking elements 62c' may be made of a material different from that of the ring 61c'.

The embodiment shown in FIGS. 5A and 5B also partially corresponds to the embodiment of FIGS. 4A and 4B, wherein the shape of the elevated portion 45d has a square section, and for the break connection there is used an assembly 60d of a number of equal components 61d each having a flat side 68d, and an opposite side 67d which has the shape of a part of a circle and comprises a breaking element 62d. The central portion 16 of the knife holder hood 13 is provided with a passage 18d whose circular edge 66d is provided with recesses 19d. In the mounted state, see FIG. 5B, the components 61d exactly fit between the edge of the passage 18d and the elevated portion 45d in order to center the knife holder relative to the rotational center line. The radial protrusions 62d exactly fit into the recesses 19d. Here, the marginal portions 68d and 69d are contiguous, and this also holds for the marginal portions 66d and 67d which have the shape of a part of a circle.

When a knife 7 hits an obstacle, overload of central and more remote parts of the drive mechanism is prevented by collapsing of the breaking elements 62d. Mutual engagement by concentric edges 66d and 67d which have the shape of a part of a circle ensures that the knife holder will remain centered. Axial separation of the knife holder 6 and the hub portion 40 is prevented by the hood 15. After the breaking the hood 15 can be removed and the components 61d can be replaced.

In the previous examples, the components used for the break connection have a small thickness, are substantially flat, so that they do not project above the central plate portion 16. In the examples, they have the same thickness as the central plate portion 16. Their thickness may be somewhat smaller, if desired.

The embodiment shown in FIGS. 6A and 6B partially corresponds to the previous embodiments, but the break connection is now formed in the material of the knife holder hood 13, within the central plate portion 16', which also functions as a centering element. In this case, a substantially circular interruption (gaps) is radially provided outside a passage 18e having an edge 19e, by means of which a central portion 16" is formed which is connected to the portion 16' with the aid of breaking bodies 62e. In the mounted state (FIG. 6B), the edge 19e exactly fits around the elevated portion 45e.

When a knife 7 hits an obstacle, overload of central and more remote parts of the drive mechanism is prevented by collapsing of the breaking elements 62e. Axial separation of the knife holder 6 and the hub portion 40 is prevented by the hood 15. After the breaking the hood 15 can be removed and the knife holder hood 13 can be replaced.

The embodiment shown in FIGS. 7A and 7B partially corresponds to the embodiment of FIGS. 6A and 6B, but the break connection is formed in the edge of the passage 18f of the knife holder hood 13, of the material of the knife holder hood 13. The break connection comprises four stiff breaking strips 62f, two in each corner, located at the corners of the edge 19f of the passage 18f and orientated in opposite directions of rotation. In the mounted state (FIG. 7B), the breaking strips engage with the corner areas of the circumference of the elevated portion 45f.

When a knife 7 hits an obstacle, overload of central and more remote portions of the drive mechanism is prevented by collapsing of the breaking strips 62f, in particular those that are located at the down stream side of the relevant corner. In this case, the edge 19f leaves some space free for accommodating a broken off strip 62f. Axial separation of the knife holder 6 and the hub portion 40 is prevented by the hood 15. After the breaking the hood 15 can be removed and the knife holder hood 13 can be replaced.

In the embodiments of FIGS. 3-7, the hood 15, which is fastened by means of the bolt 14 screwed into the hole 48, keeps the knife holder axially in its place, also after the break connection has collapsed (as an alternative, the hub portion may be provided with a screw threaded end and the hood may be provided with a matching screw threaded receiving space). In this case, there is a chance that the hood, which rotates together with the hub portion 40, will experience a decelerating force exerted by the (retained) knife holder. The hood may transfer said force to the bolt, so that the hood connection on the hub portion will be tighter or looser, depending on the direction of rotation. A comparable problem occurs in arrangements in which the hub and the knife holder are tightened against each other by means of a bolt connection which extends therethrough, wherein the bolt head or the nut is located on a so-called pressing element that presses itself against the knife holder. When the knife holder is stopped or decelerated relative to the hub, it is possible for the pressing element to rotate the bolt or the nut, so that the connection may come loose, which may be dangerous.

In order to prevent this, the elevated portion 45 of the hub portion may, for example, extend to some extent above the break connection so as to form a laterally orientated engagement surface for a matching section at the lower side of the hood or the pressing element, so that it will be impossible for the hood or the pressing element to rotate relative to the hub portion.

This is shown for a pressing element in FIGS. 8A-D, of which FIG. 8A shows a top view of the hub flange 42b' comprising an elevated portion 45b' which, like the elevated portion 45b of FIGS. 3A and 3B, is provided with recesses 65b' for breaking elements, here breaking elements 62b' of FIG. 8B. The elevated portion 45b is additionally raised by an elevation 81b' having a circumferential edge 82b' that bounds a square shape. This square shape is adjusted to receive in a closely fitting manner the edge 83b' of the pressing element 15b' shown in FIG. 8C. The pressing element 15b' has a flat lower surface 87b', a hole 84b' comprising an edge 86b' and a bottom 85b'.

Upon achieving the assembled state as shown in FIG. 8D, the conical gearwheel 22b' together with the pin 88b' provided with splines is inserted into the case 41b' and extends through the hole 48b' of the hub flange 42b'. The breaking elements 62b' are placed in the recesses 65b' and are surrounded by the knife holder 13, the breaking elements 62b' being fittingly received in the recesses 19b' of the edge 18b'. Subsequently the pressing element 15b' comprising the hole 84b' is disposed on the pin 88b', while the lower surface 87b' will be located on the elevated portion 45b', on the breaking elements 62b' and on the upper surface 16b' of the knife holder. The edge 83b' will be fittingly located around the elevation 81b'. By screwing and tightening the nut 14b' on the pin, the mentioned components will be kept together. In this case, the nut 14b' abuts against the bottom 85b' of the pressing element 15b'.

After the breaking elements 62b' have collapsed, the engagement of the edges 83b' and 82b' prevents mutual rotation of the hub flange 42b' and the pressing element 15b' and thus of the nut 14b' relative to the pin 88b'.

It is pointed out that the elevated portion 45b' may also be divided, comprising a ring as shown in FIG. 4C. Furthermore, the elevation 81b' may form a separate top element which may be fittingly mounted on the hub flange 42b' for combined rotation therewith.

In the case of FIGS. 6A, 6B, there may still be distinguished between a hood portion which should axially fasten the knife holder on the hub portion before an impact, and a hood portion which should prevent the knife holder portion that has come loose from upwardly coming loose from the device. In this case, an inner portion of the hood may, for fastening, engage with the portion 16" of the hood, and an outer portion of the hood may be designed differently in order to form a stop for the rest of the knife holder that has come loose from the portion 16". In this case, the inner portion and the outer portion may form a stepped portion of the hood.

Figure 8E:
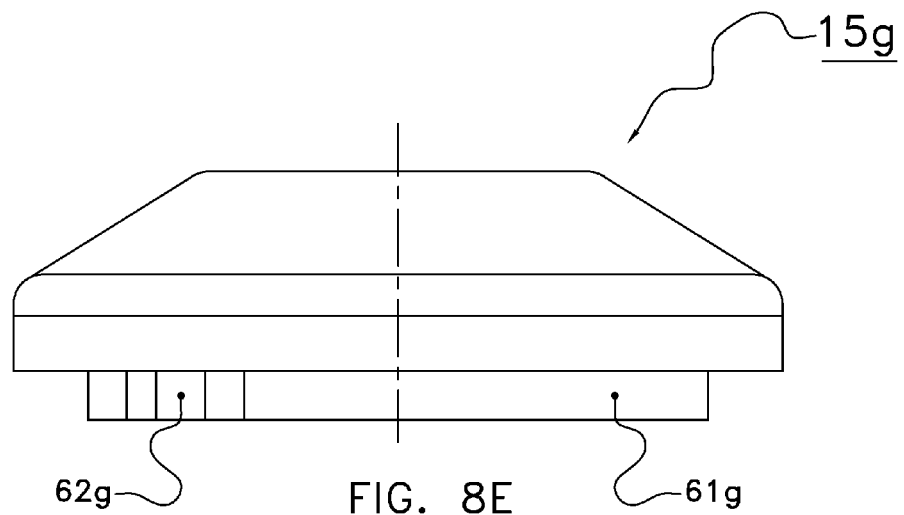
FIGS. 8E-G, respectively, are a side view and a bottom view of a pressing element or retaining element for an alternative embodiment according to the invention, and a vertical cross-sectional view of a mowing unit comprising said pressing element.
Figure 8F:
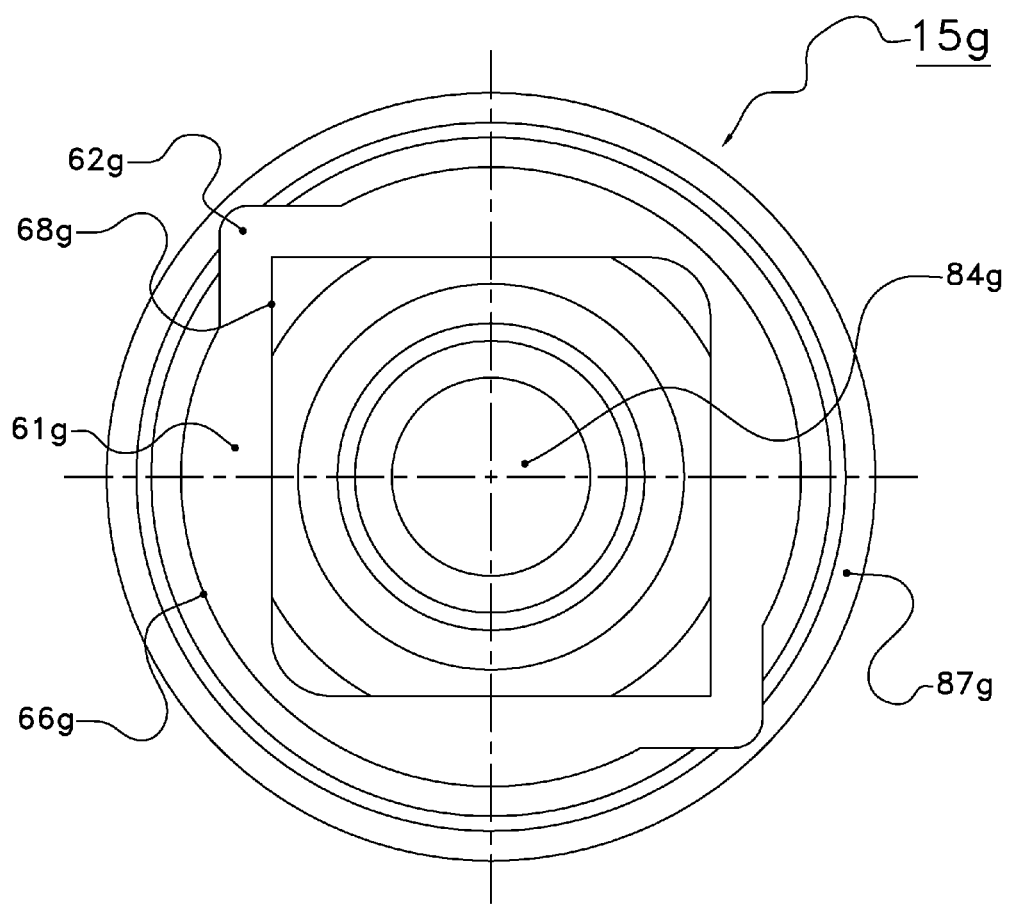
Figure 8G:
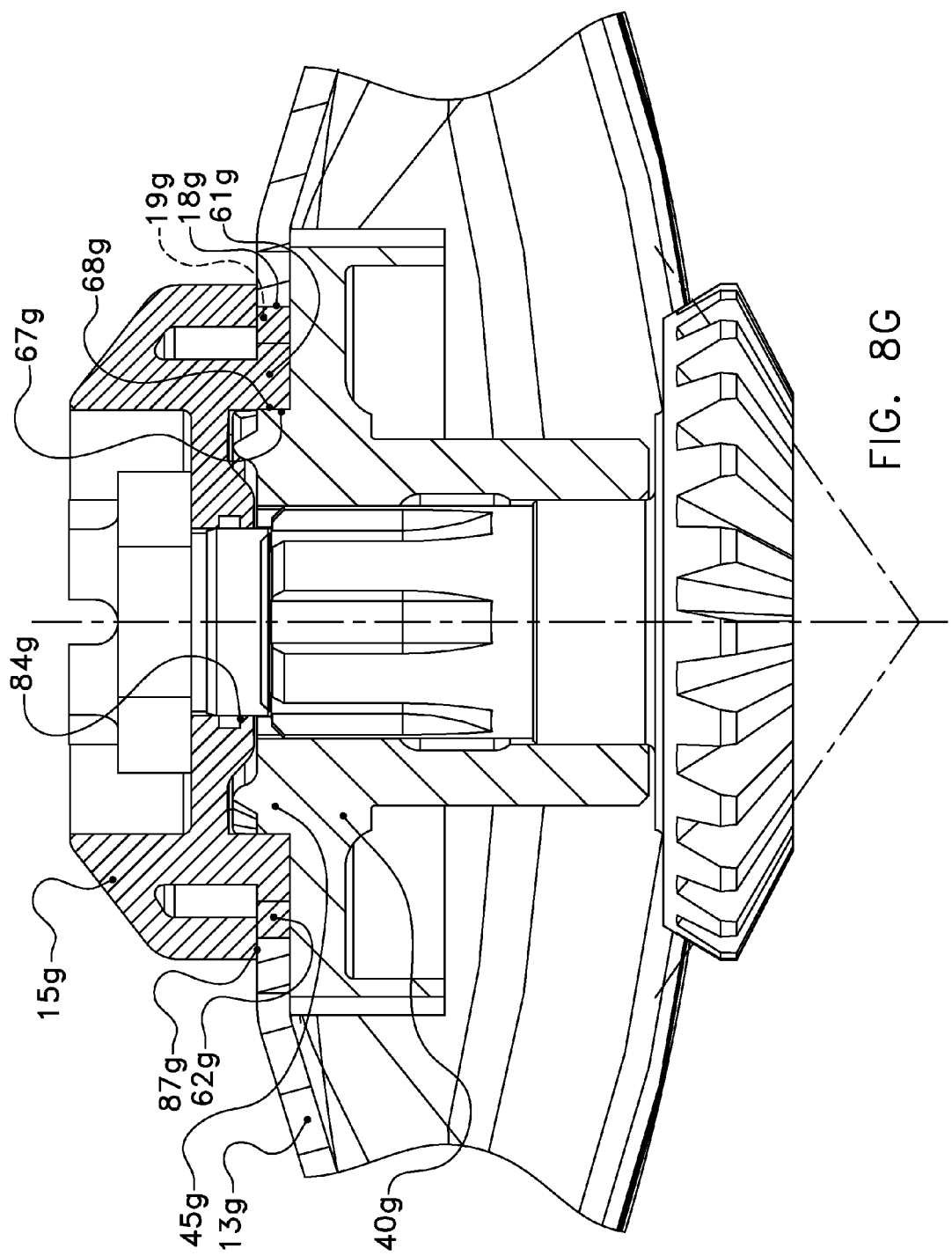

FIGS. 8E and 8F show a retaining element in the form of a pressing element 15g which, like the pressing element 15b', can be fastened on the hub by means of a nut/bolt connection, while the knife holder is clamped. The pressing element 15g is provided with a passage 84g for the bolt connection and with a downwardly extending collar 61g which, by means of an inner edge 68g at the inner side, defines an unround hole which exactly fits an unround elevated portion of a hub flange 42g (FIG. 8G). The collar 61g has an outer surface 66g which is substantially circular and comprises in this embodiment two radial protrusions 62g.

In the assembled state of FIG. 8G, the knife holder 13g is mounted on the hub flange 42g and subsequently the pressing element 15g is mounted. The edge 68g exactly fits around the edge 67g of the elevated portion 45g and the edge 86g exactly fits within the edge 18g of the knife holder 13g. It is pointed out that the lower edge of the collar 61g may also be formed as a flange, different from the FIGS. 8E and 8F. The protrusions 62g exactly fit into recesses 19g in the hole edge 18g of the knife holder 13g; by means of the lower edge 87g the pressing element 15g presses on the upper side of the knife holder 13g.

Figure 9A:
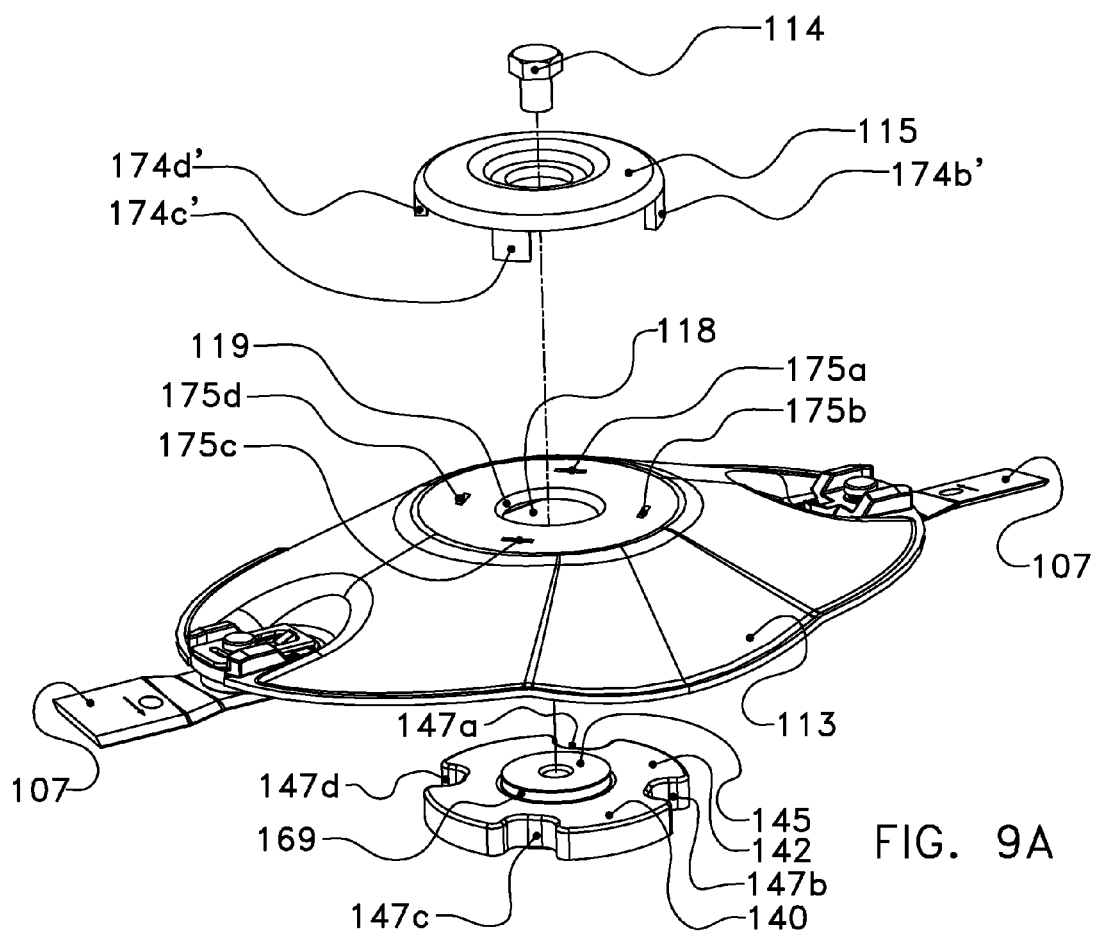
FIGS. 9A and 9B, respectively, are an isometric and partially cut away view of part of a mowing unit of another embodiment of a mowing device according to the invention and a cross-sectional view thereof.
Figure 9B:
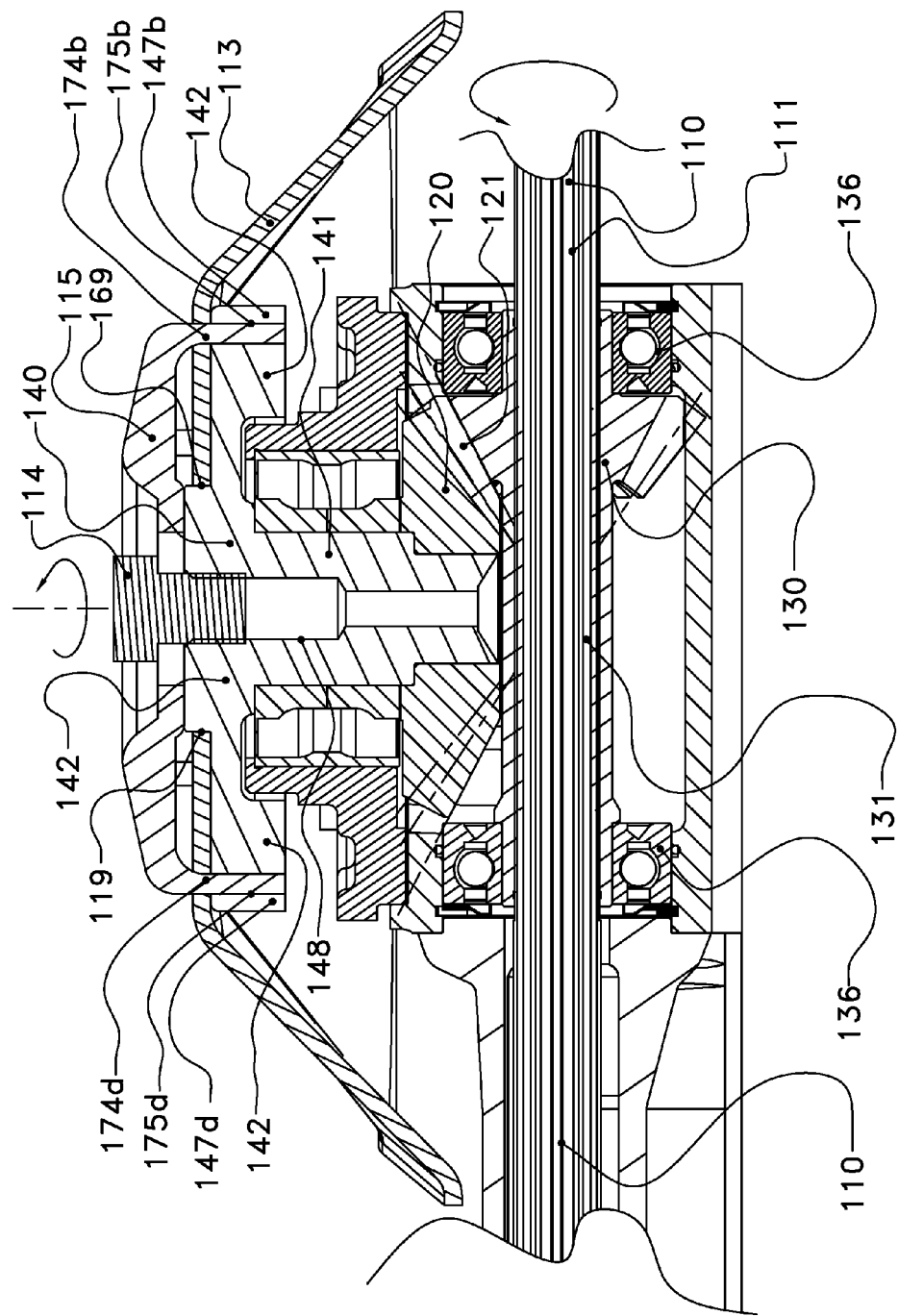

The embodiment shown in FIGS. 9A and 9B also corresponds to a large extent to the embodiment of FIG. 2, wherein the breaking bolts have been replaced by a hood 115 which is fastened on the mowing unit by means of a bolt 114 which is screwed into the hole 148 of the hub 140. At its edge the hood 115 is provided with axially extending fingers 174a-d which, by means of a target position of breaking, are connected to the rest of the hood 115. The fingers 118 closely fit into correspondingly formed holes 175a-d in the knife holder hood 113 and also into radial recesses 147a-d in the flange 142 of the hub 140.

When a knife 107 hits an obstacle, overload of central and more remote parts of the drive mechanism is prevented by breaking of fingers 174a-d of the hood 115 in the region of the transition between the holes 175a-d and 147. The fingers remain partially behind in the recesses 147. Axial separation of the knife holder 113 and the hub 140 is prevented by the hood 115 which remains fastened on the hub 140 by means of the bolt 114. After the breaking the hood 115 can be replaced. The stability of the knife holder hood 113 is maintained by the fitting engagement and guiding in the region of the concentric edges 169 and 119 of the elevated hub portion 145 and the hole 118.

Figure 10A:
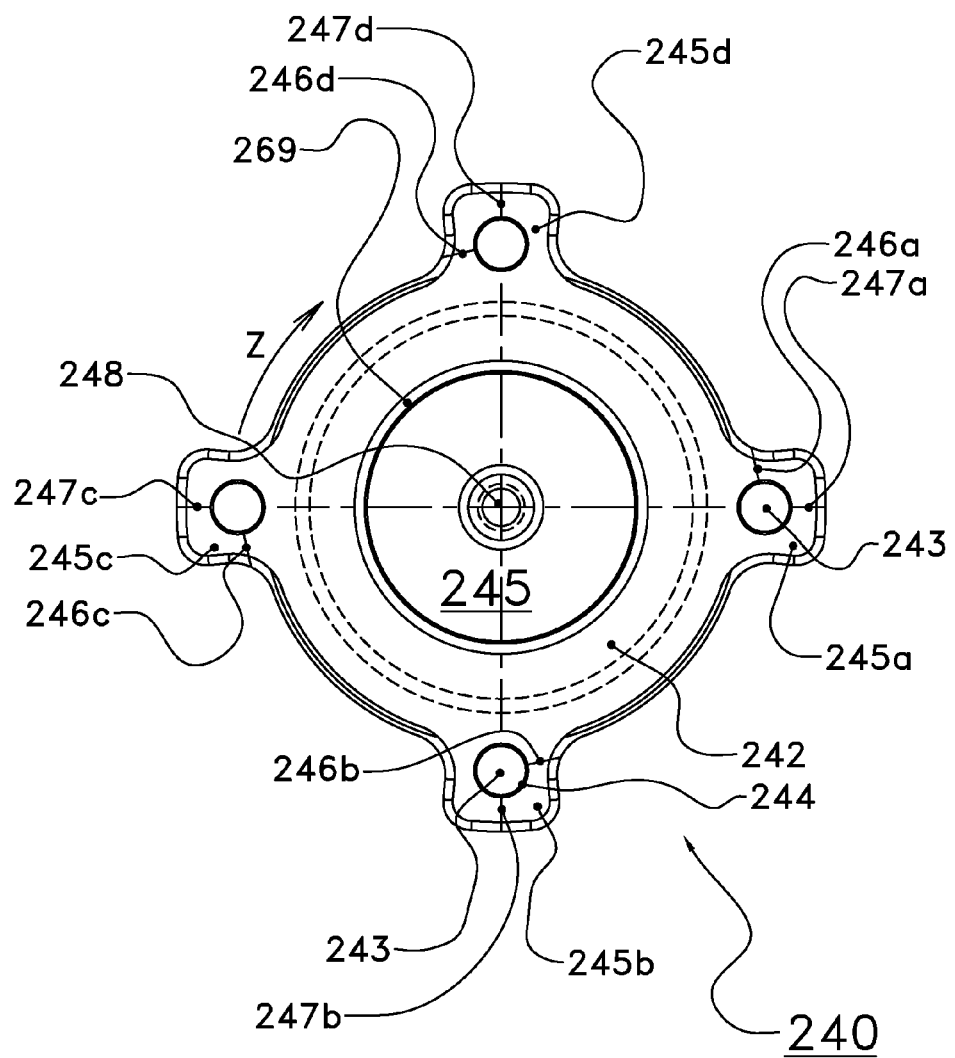
FIGS. 10A and 10B, respectively, are a top view and a cross-sectional view of a component of another embodiment of a mowing device according to the invention.
Figure 10B:
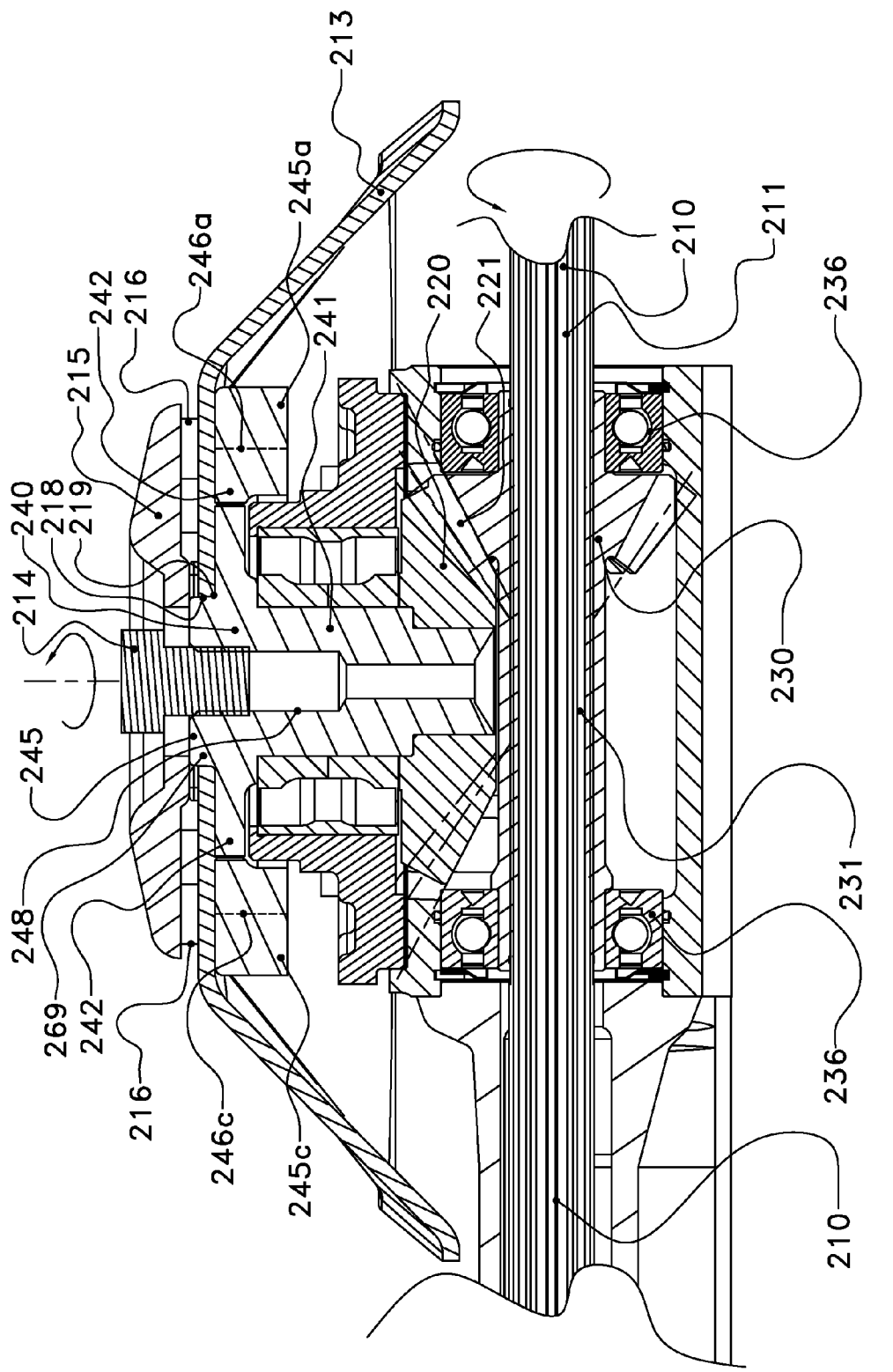

The embodiment shown in FIGS. 10A and 10B also corresponds to a large extent to the embodiment of FIG. 2. For the fastening of the knife holder hood 213 on the hub 240 there are used ordinary bolts 216 which extend through holes 217 in the knife holder hood 213 and are screwed into holes 243 in the flange 242 of the hub 240. The holes 243 are now located on parts 245a-d of the flange 242, said parts 245a-d each being provided with a weakening 246a-d that extends in a circumferential direction of the hub 240 and with a weakening 247a-d that extends in a radial direction, in both cases from the relevant hole 243a-d. The hub flange 242 is provided with a central elevated portion 245 having a circular circumferential edge 269. The circumferential edge 269 closely fits into the hole 218, bounded by the circular edge 219, of a knife holder 213 that corresponds to a large extent to the knife holder of FIG. 9a.

A hood 214 extends over the bolts, which hood is fastened on the mowing unit by means of a bolt 215 screwed into the hole 248 of the hub 240.

When, during rotation of the hub 240 in the direction Z, a knife that is fastened on the knife holder hood 213 hits an obstacle, overload of central and more remote parts of the drive mechanism is prevented by collapsing of the flange portions 245a-d in the region of the lines 246a-d and 247a-d. Axial separation of the knife holder hood 213 and the hub 240 is prevented by the hood 214 that is fastened on the mowing unit. The knife holder hood 213 remains centered relative to the hub 240 by engagement and guiding in the region of the edges 269 and 219. After the breaking the hub 240 can be replaced.

Alternatively, it is possible for the bolts 16 to reach through holes 17 which are located in parts which are breakable from the rest of the knife holder hood 13, such as for example an inner ring. After the breaking, the knife holder hood 13 should be replaced.

FIG. 11 shows a mowing unit in a demounted state, according to FIG. 2. The knife holder 306a, 306b, together with the knife holder hood 313, is fastened on the hub 340, in particular the flange 342 thereof, by means of bolts 316 that extend through bolt holes 317. The bolt heads may be covered by a small hood 314 secured by means of a small bolt 315. The knife holder hood 313 is, together with the hub 340, rotatable about R1, see FIG. 12A. The second conical gearwheel 320 is, for co-rotation, fastened on the hub 340 by means of engagement of an external screw thread on the end 344 of an axis 341 of the hub 340 with an internal screw thread in the borehole 323 of the gearwheel 320. The fastening corresponds to that shown in FIGS. 16-18.

Figures 12A, 12C:
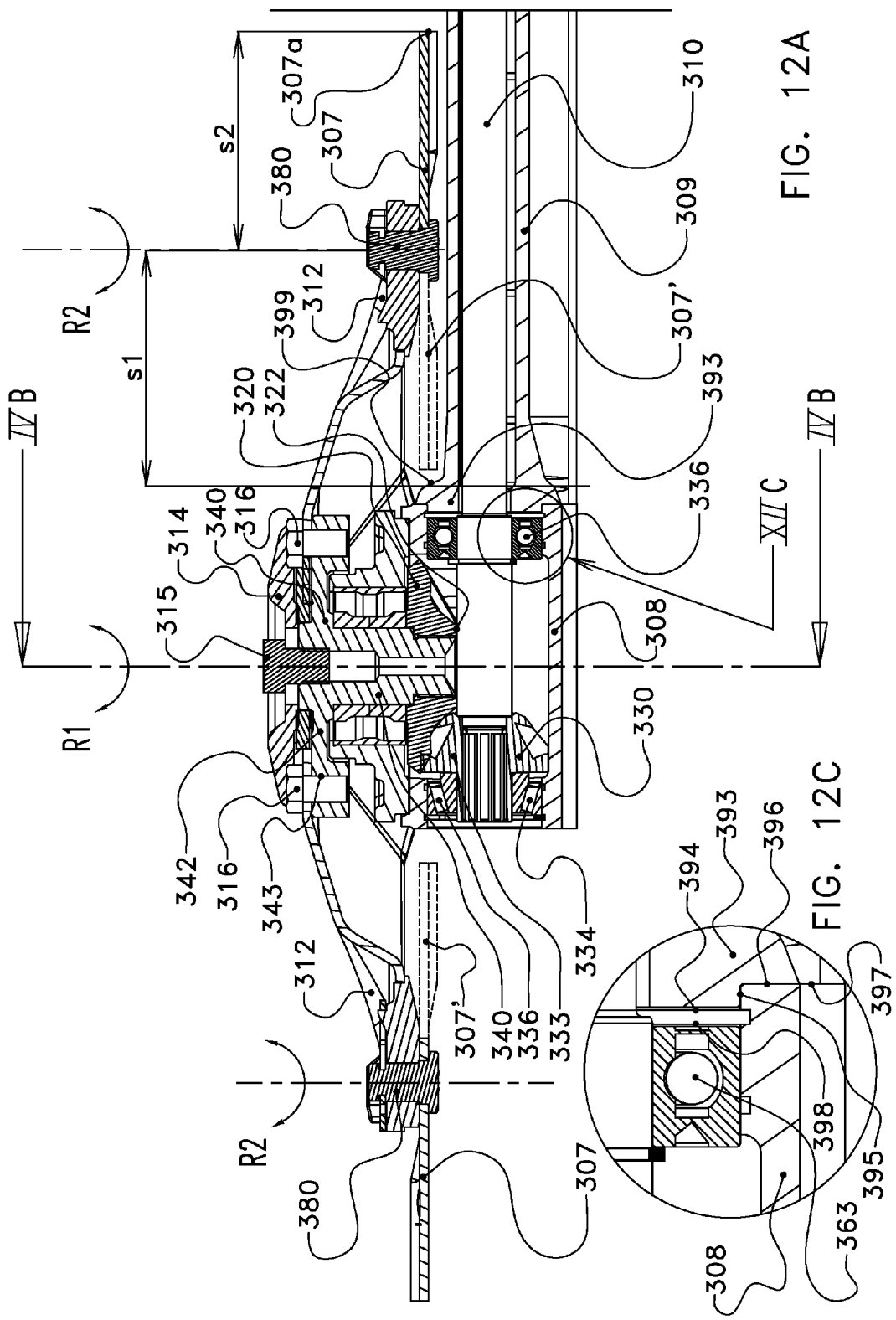
FIGS. 12A-C, respectively, are a longitudinal sectional view and a cross-sectional view of a mowing unit for the mowing device of FIG. 11.

The knife holder hood 313 is oval, knives 307 being mounted at its longitudinal ends, in the region of knife carrying portions 312, by means of pins 380, said knives being freely rotatable about said pins 380 (R2, see FIG. 12A). The knives have a free end 307a and an inner end 307b where the pin 380 is located.

Figure 16:
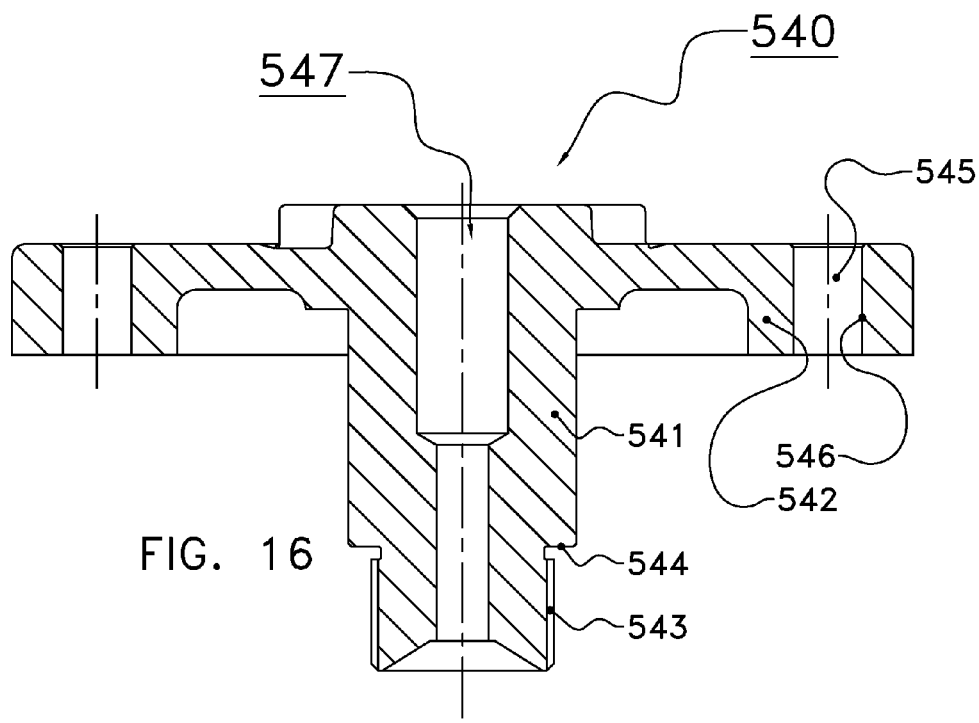
FIG. 16 is a vertical cross-sectional view of a hub portion of the device of FIG. 11.
Figure 17:
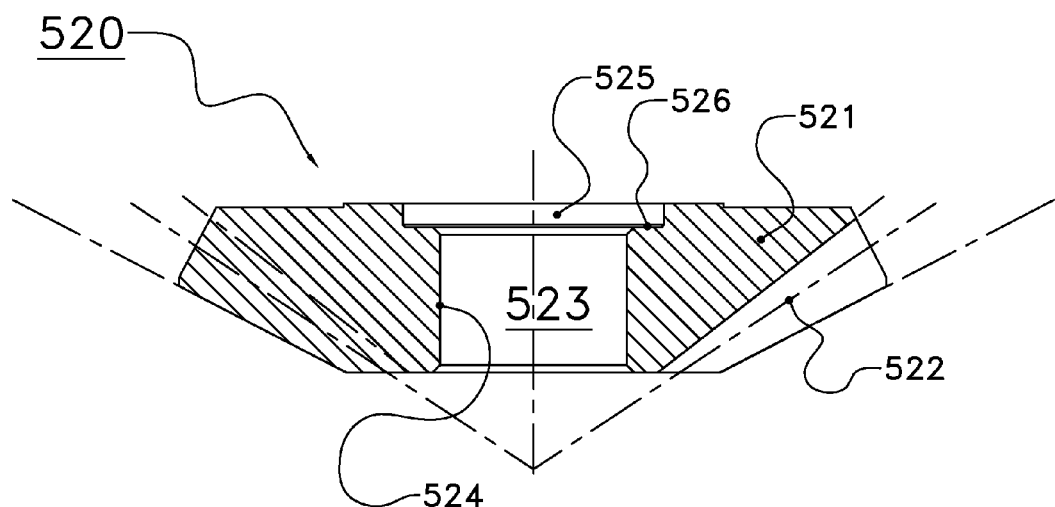
FIG. 17 is a vertical cross-sectional view of a gearwheel portion of the device of FIG. 11.
Figure 18:
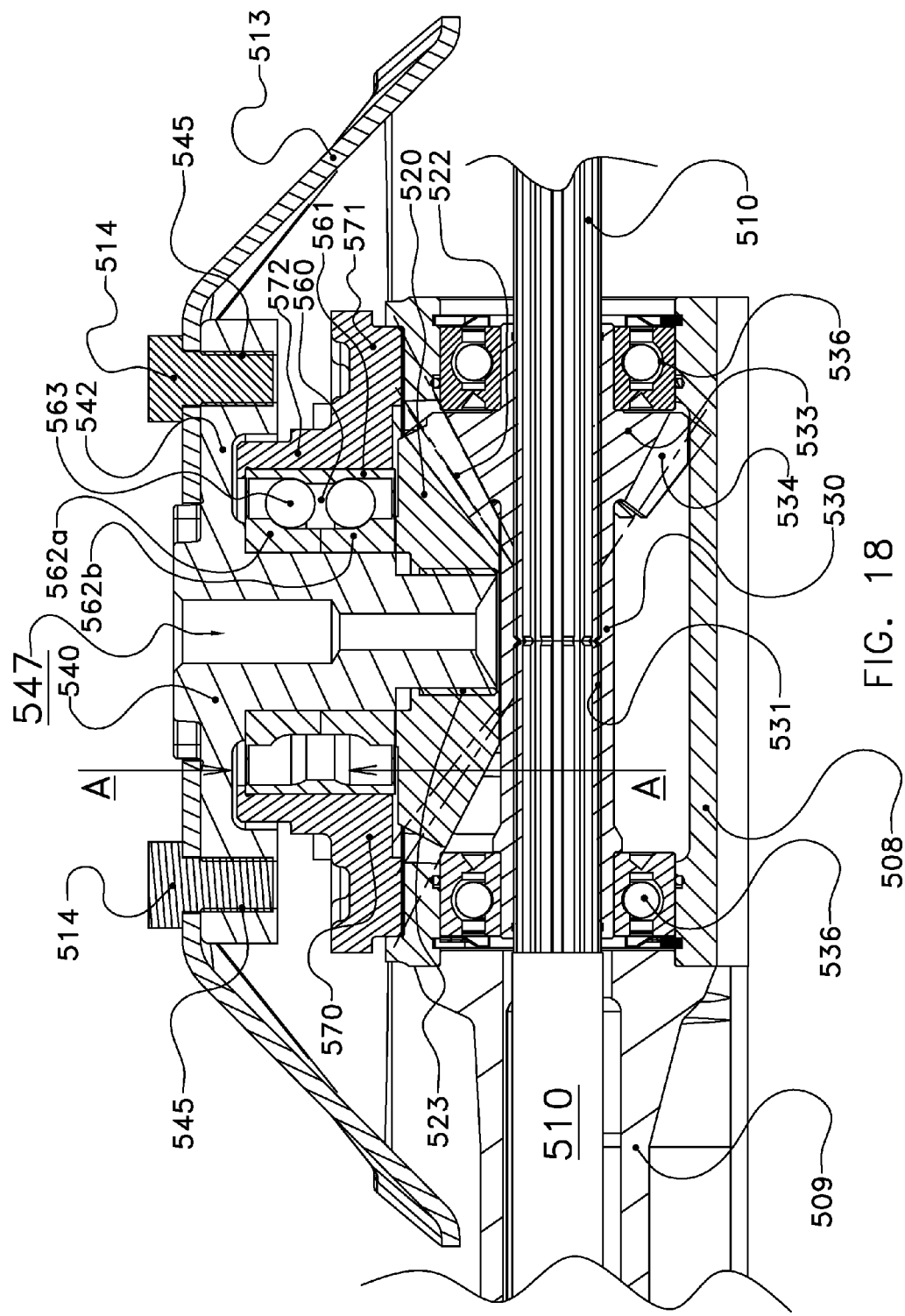
FIG. 18 is a vertical cross-sectional view of a mowing unit of the mowing device of FIG. 11.

The assembly hub 340/gearwheel 320 is rotatably bearing supported within a hollow shaft or construction 370 which is fixedly connected to the drive housing 308 by means of a flange 371, as shown in FIGS. 16-18.

Angular contact bearings 360 are disposed and pre tightened between the case 372 of the construction 370 and a pin 341 of the hub 340, as shown in FIGS. 16-18.

Owing to the simple manner in which the second gearwheel 320 is connected to the hub 340, only one axial body, in the form of the pin 341, having a radial external dimension D1, is present within the bearings 360. As a result, the radial external dimension of the bearings 360 can be kept limited, and thus the radial external dimension of the construction 370 and the flange 371, and thus the radial external dimension D2 of the upright wall 391 of the drive housing 308, on the upper edge 390 of which the construction 370 is fastened.

Figure 12B:
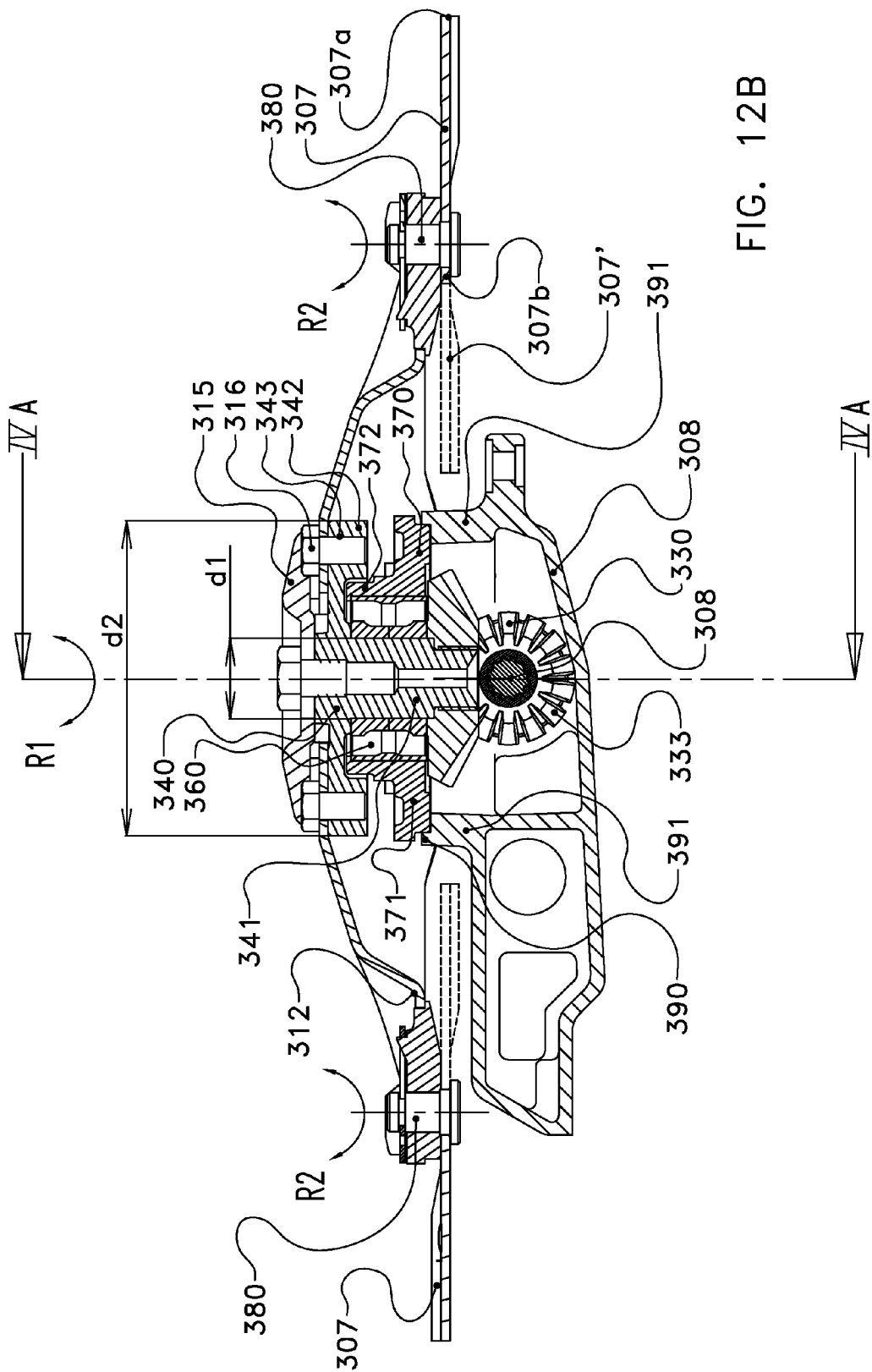

In the assembled state shown in FIGS. 12A and 12B, the drive shaft 310 extends through a drive case 330, wherein the internally toothed borehole 331 of the case 330 is in projecting shaft connection (spline) with an external toothing on the drive shaft 310, so that the drive case 330 rotates together with the drive shaft 310. In this case, the drive case 330 is bearing supported in the drive housing 308 by means of bearings 336. At one end, the drive case 330 is provided at its outside with a first conical gearwheel 333 having a toothing 334. The toothing 334 is in engagement with the toothing 322 of the second conical gearwheel 320.

The bearings 336 are axially outwardly retained by the axially orientated head edge surface 394 of the end edge 393 of the intermediate housing 309, see also the detail of FIG. 12C. Radially outside the head edge surface 394 the end edge 393 is stair-shaped, having an axial edge portion (collar) 395 and a shoulder 396. The intermediate housing 309 fits by means of the shoulder 396 against the end edge 397 of the drive housing 308, the axial edge portion 395 closely fitting the aperture 398 (see also FIG. 11) of the housing 308. By means of this connection between the two housings 308 and 309 it is possible to keep the axial length of the drive housing 308 limited. A mounting ring, and possibly also a bearing retaining ring, may be omitted.

At the upper side, axially at a short distance behind the end edge 393, the intermediate housing 309 is stair-shaped (399), so that there is provided space for a knife end 307a in the inwardly rotated position (shown by dashed lines) of the knife 307'. The dimension S1 of the external surface of the stair 399 to the pin 380 is greater than the distance S2 (1 dm or more) from the pin 380 to the knife end 307a. Since the stair 399 is located somewhat outside the wall 391, the knife end 307a, also in the cutting plane of FIG. 12b, will not hit the drive housing 308 and the intermediate housing 309, so that, over the entire rotation of the knife holder hood 313, the knife ends 307a will be able to rotate inwardly without hitting the housing 308.

Figure 13A:
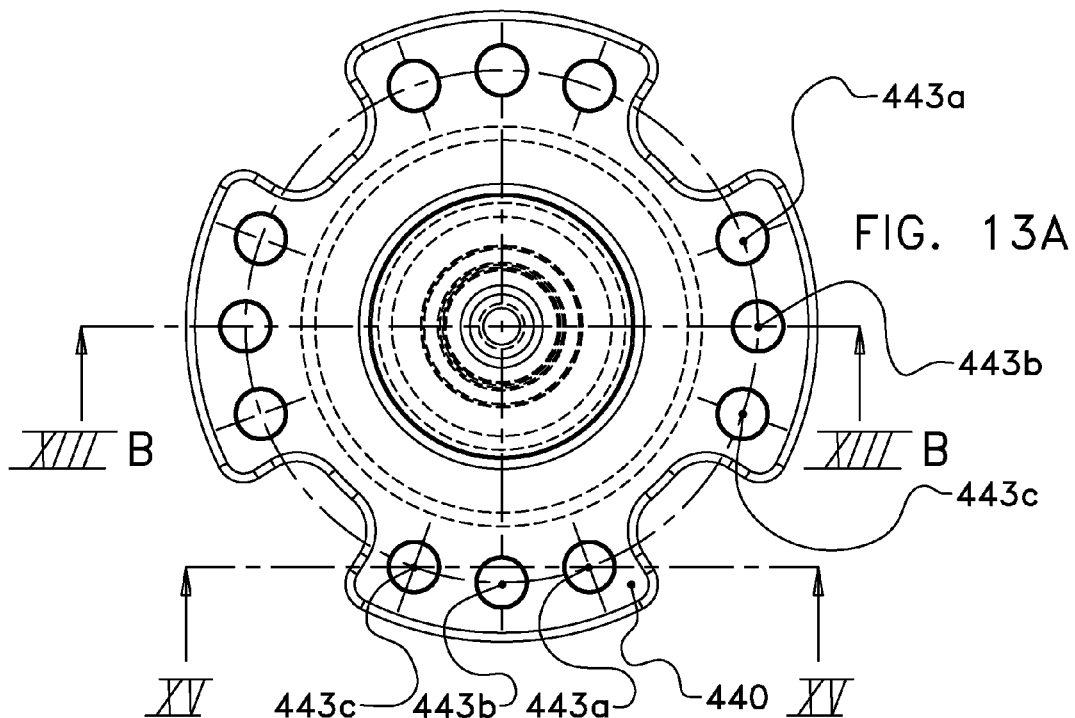
FIGS. 13A and 13B are a top view and a vertical cross-sectional view of the hub unit for the device of FIG. 11.
Figure 13B:
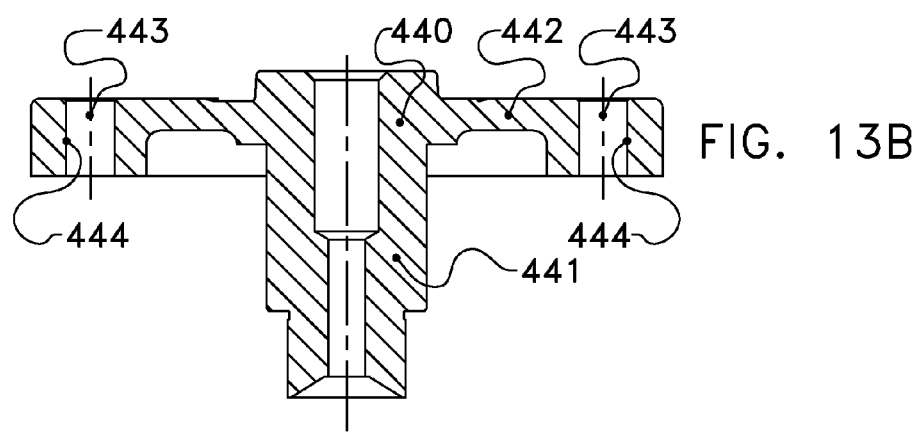

The hub 440 shown in FIGS. 13A and 13B comprises the pin 441 and a flange 442. Near its edges, the flange 442 is provided with a number of groups of holes 443a-c having an internal screw thread 444. In this example, there are four groups of holes 443a-c, which are regularly spread over the circumference, but there may also be provided more or fewer groups. The number of holes 443 (here three) in a group may also be larger or smaller (two).

Figure 14:
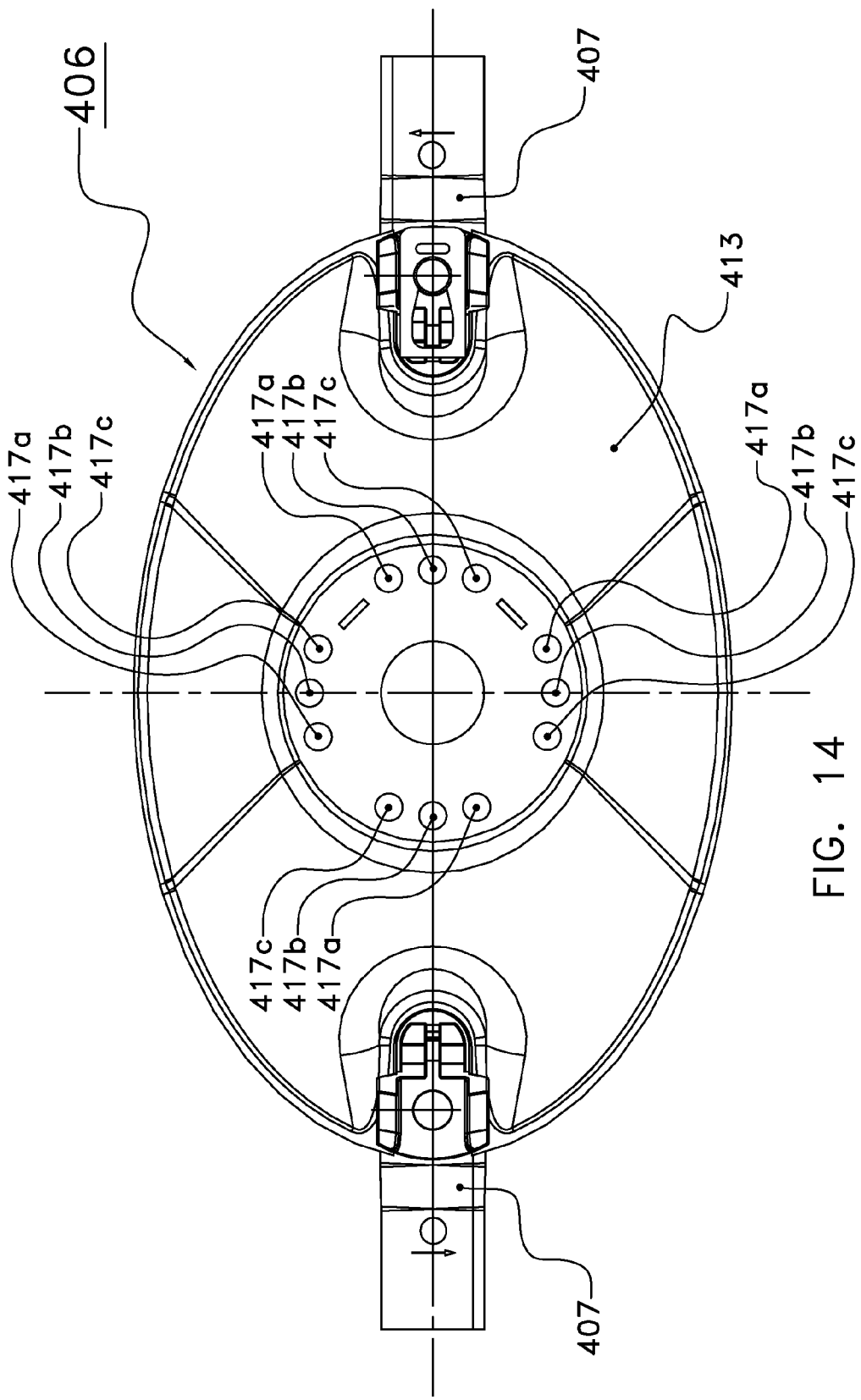
FIG. 14 is a top view of a knife holder for the device of the preceding figures.

The knife holder 406 shown in FIG. 14 is provided, in its knife holder hood 413, with the same number of groups (four in this case) of holes 417a-c, each group having the same number (three in this case) of holes 417a-c as in the hub flange 442, arranged in a matching manner.

By means of bolts 416, one per group of holes, the knife holder hood 413 of the knife holders 406 is fastened on the hub flange 442. In this case, each bolt 416 extends through a hole 417a and is screwed by means of the screw thread of the latter into the screw thread 444 of a bolt hole 443a. The holes 417b and 443b and the holes 417c and 443c are not in use but ready to be used.

Figure 15:
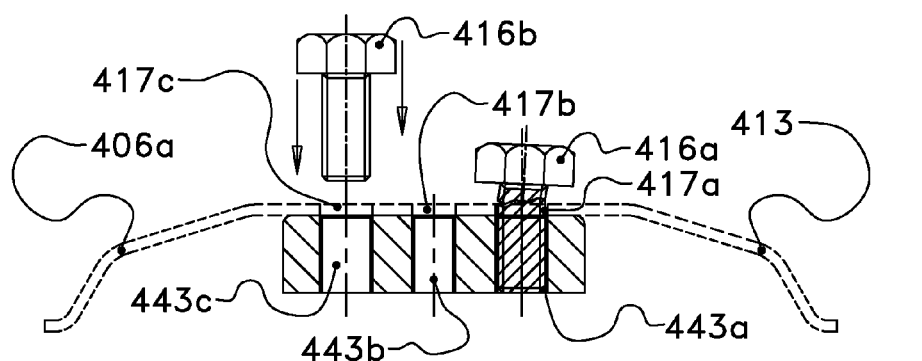
FIG. 15 is a diagrammatic, partial cross-sectional view according to XIV XIV in FIG. 13A.

When a knife of a mowing unit hits a non yielding object and overload of the knife holder-hub connection occurs, one or more of the bolts 416 used may deform or collapse. The deformation or the state of the bolt afterwards may be such that it is impossible to replace the bolt on the spot. This is diagrammatically illustrated in FIG. 15. However, it is possible for the user to effect in a simple manner a new connection, parallel to the collapsed connection(s), for each deformed bolt 416. For reasons of safety, four new bolts 416 may then be inserted into the four holes 417b and 443b. The mowing process can soon be resumed.

It is pointed out that the principle of the invention may also be applied to other agricultural implements provided with one or more rotating processing units.

The hub 540 shown in FIG. 16 comprises a pin 541 and a flange 542, a borehole 547 extending through the flange and the pin. The pin 541 is provided at its lower end with an external screw thread 543 and thereabove with a shoulder 544. The flange 542 is provided near its edges with a number of holes 545 having an internal screw thread 546.

The second gearwheel 520 shown in FIG. 17 comprises a ring 521 having a conical toothing 522. The ring 521 has a borehole 523 with an internal screw thread 524. Thereabove is a widened portion 525 having a shoulder 526.

In the assembled state shown in FIG. 18, the drive shaft 510 extends through a drive case 530, wherein the internally toothed borehole 531 of the case 530 is in projecting shaft connection (spline) with the external toothing on the drive shaft 510, so that the drive case 530 co-rotates with the drive shaft 510. In this case, the drive case 530 is bearing-supported in the drive housing 508 by means of bearings 536. At one end, the drive case 530 is provided at its outside with a first conical gearwheel 533 having a toothing 534. The toothing 534 is in engagement with the toothing 522 of the second conical gearwheel 520.

By means of the screw thread 543 at the end of the pin 541, the hub 540 is screwed into the borehole 523 that is provided with an internal screw thread 524. Depending on the dimensions of the bearings to be mounted and the desired pre tightening, the pin 541 may be screwed more or less far into the second gearwheel 520. If desired, said connection may further be secured by additionally using an adhesive, such as glue.

Previously to implementing the screw connection between the pin 541 and the second gearwheel 520, angular contact bearings 560 are disposed, in particular within the collar 572 thereof. The depicted bearings 560 comprise a one-part outer ring 561 and a two-part inner ring 560a, 562b, comprising two series of balls 563. Upon tightening the screwed connection 543/524, the flange 542 of the hub 540 will press on the upper inner ring 562a and the gearwheel 520 will press on the lower inner ring 562b, see directions A, so that the two inner rings 562a, 562b are pre tightened, to a desired extent, between the second gearwheel 520 and the flange 542. Due to the pre tightening, an unwanted breaking of the pin-gearwheel connection, such as in the case of a sudden obstruction of the rotational movement of the knife holder that is fastened on the hub, is counteracted.

After the knife holder hood 513 has been disposed on the upper side of the flange 542 of the hub 540, the bolts 517 may be screwed, by means of their screw threads, into the boreholes 545 in the flange 542 in order to secure the knife holder hood 513 on the hub 540. If desired, a (not shown) flat hood (such as the small hood 314 of FIG. 11) may be disposed over the bolt heads, with hardly any adverse effect on the constructional height. Mowed grass will then have sufficient height above the shown mowing unit to move thereover in the direction D (FIG. 1) of the area in front of the cutter bar to the area behind it.

The above-mentioned description is included in order to illustrate the operation of preferred embodiments of the invention, and not to limit the scope of the invention. On the basis of the above-mentioned explanation, it will be obvious for a person skilled in the art that there are many variations falling within the spirit and scope of the present invention.

What is claimed is:

1. A device for mowing crops, comprising a series of mowing units arranged side by side at predetermined distances, each mowing unit comprising a knife holder with at least one knife carrying portion for carrying a mowing knife, and a drive mechanism for each knife holder, wherein the drive mechanism for each knife holder comprises:
   a first drive element comprising a hub portion for carrying the respective knife holder, and
   a second drive element drivingly engaged with the first drive element to rotatingly drive the knife holder about a vertical axis,
   wherein, in normal operation, the knife holder and the hub portion form a unitary rotatable assembly which, at a position between the knife carrying portion and the hub portion, is provided with a break connection which is effective in a radial direction with a plane of breaking having a normal with a radial directional component perpendicular to the axis; and
   wherein the break connection-is positioned at a radial outside of the hub portion or radially outwardly thereof.

2. Device according to claim 1, wherein the break connection is situated in or near the transition between the knife holder and the hub portion.

3. Device according, to claim 2, wherein the break connection interconnects the knife holder and the hub portion in a radial direction.

4. Device according to claim 1, wherein the break connection constitutes part of an added body.

5. Device according to claim 4, wherein the added body is a ring.

6. Device according to claim 5, wherein the ring does not project above a plate portion of the knife holder.

7. Device according to claim 1, wherein the break connection is situated at the upper side of the hub portion.

8. Device according to claim 7, wherein the knife holder forms a plate portion above the hub portion, wherein the break connection is situated flush with the plate portion.

9. Device according to claim 8, wherein the plate portion is provided with an aperture which is concentric with a drive center line, wherein the hub portion is provided with an upper part which extends into said aperture.

10. Device according to claim 9, wherein the break connection is situated at the radial outside of the upper part of the hub portion or radially outwardly of the radial outside of the upper part of the hub portion.

11. Device according to claim 9, wherein the break connection is effective at the edge of the aperture.

12. Device according to claim 11, wherein the break connection is unitary with one or more centering elements for centering the knife holder relative to the center line.

13. Device according to claim 12, wherein the one or more centering elements are provided on a pressing element which presses the knife holder vertically against the hub portion, wherein the one or more centering elements are provided with at least one of: one or more of the break connections and one or more with recesses for the one or more break connections.

14. Device according to claim 12, wherein a plurality of centering elements are present, which are successive in the direction of rotation and which are each provided with one or more breaking elements.

15. Device according to claim 11, wherein the break connection, by means of breaking elements, extends in a positively locked manner into one or more recesses in the hub portion which centers the knife holder.

16. Device according to claim 11, wherein the break connection, by means of the breaking elements, extends in a positively locked manner into a centering element for centering the knife holder relative to the center line.

17. Device according to claim 11, wherein the break connection comprises breaking elements which are unitary with an inner portion of the break connection that is radially located at the inside thereof, to mount the knife holder on the hub portion.

18. Device according to claim 11, wherein the break connection extends in a positively locked manner into one or more recesses in the edge of the aperture by means of one or more breaking elements.

19. Device according to claim 9, wherein the break connection comprises breaking elements which are unitary with the edge of the aperture, which breaking elements engage with the upper part of the hub portion.

20. Device according to claim 1, wherein the break connection is located in the material of the knife holder.

21. Device according to claim 1, wherein the break connection comprises a weakened portion of material of the hub portion.

22. Device according to claim 21, wherein the hub portion comprises a hub flange, on which the knife holder is supported, wherein the weakened portion is provided in the material of the hub flange.

23. Device according to claim 21, wherein the weakened portion interconnects two hub portion parts which are located concentrically with each other and which, after the weakening has collapsed, are located in a manner in which they fit into each other.

24. Device according to claim 21, wherein the weakened portion comprises a breakaway radial protrusion which is fittingly received in a recess in the knife holder.

25. Device according to claim 21, wherein the knife holder and the hub portion are provided with first and second edges which engage with each other in a concentric manner relative to the center line and, after the break connection has collapsed, provide each other a guide means for rotation about the center line.

26. Device according to claim 1, wherein the break connection comprises a weakened portion of the material of the knife holder.

27. Device according to claim 26, wherein the weakened portion interconnects two knife holder portions which are located concentrically with each other and which, after the weakening has collapsed, are located in a manner in which they fit into each other.

28. Device according to claim 26, wherein the weakened portion comprises a breakaway radial protrusion which is fittingly received in a recess in the hub portion.

29. Device according to claim 1, provided with a retaining element to keep or tighten the knife holder or parts thereof in an axial direction against the hub portion, or to prevent the knife holder from leaving the hub portion in an upward direction, wherein the break connection is provided in material of the retaining element.

30. Device according to claim 29, wherein the break connection is provided in material of the retaining element in the form of a protrusion which fits into a recess in the knife holder.

31. Device according to claim 1, provided with a retaining element to keep or tighten the knife holder or parts thereof in an axial direction against the hub portion, or to prevent the knife holder from leaving the hub portion in an upward direction, wherein the break connection is provided by means of added breaking elements which fit into recesses in the retaining element and in the knife holder.

* * * * *